United States Patent
Sullivan

(10) Patent No.: US 11,758,896 B2
(45) Date of Patent: Sep. 19, 2023

(54) HIGH RESOLUTION SPRAY SECTION HEIGHT CONTROL AND DYNAMIC NOZZLE HEIGHT ADJUSTMENT

(71) Applicant: DEERE & COMPANY, Moline, IL (US)

(72) Inventor: Dennis J. Sullivan, Ankeny, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 17/579,912

(22) Filed: Jan. 20, 2022

(65) Prior Publication Data

US 2022/0142141 A1 May 12, 2022

Related U.S. Application Data

(63) Continuation of application No. 16/034,785, filed on Jul. 13, 2018, now abandoned.
(Continued)

(51) Int. Cl.
*A01M 7/00* (2006.01)
*B05B 1/20* (2006.01)
*A01G 25/09* (2006.01)

(52) U.S. Cl.
CPC ........ *A01M 7/0071* (2013.01); *A01G 25/09* (2013.01); *A01M 7/006* (2013.01);
(Continued)

(58) Field of Classification Search
CPC ....... A01G 25/09; A01M 7/0042; B05B 15/68
(Continued)

(56) References Cited

U.S. PATENT DOCUMENTS

| 1,348,038 A | 7/1920 | Falk |
| 2,190,590 A * | 2/1940 | Clayton ............... C11B 3/06 554/199 |

(Continued)

FOREIGN PATENT DOCUMENTS

| BE | 636697 A | 1/1963 |
| CN | 103918632 A | 7/2014 |

(Continued)

OTHER PUBLICATIONS

Brazilian Office Action issued in Patent Application No. 1020180683489, dated Apr. 27, 2022, in 04 pages.
(Continued)

*Primary Examiner* — Jason J Boeckmann
(74) *Attorney, Agent, or Firm* — Taft Stettinius & Hollister LLP; Stephen F. Rost

(57) ABSTRACT

A spray boom for spraying a fluid on a target includes a boom frame and a spray section coupled to the boom frame. The spray section includes a spray pipe configured to be fluidly coupled to a fluid source and a nozzle coupled to the spray pipe and configured to be fluidly coupled to the fluid source. An actuator is coupled at one end to the boom frame and at an opposite end to the spray section. The actuator is controllably extending and retracting to move the spray pipe and nozzle between a raised position and a lowered position. A trip assembly is coupled between the boom frame and actuator for biasing the spray section to a biased position in which the actuator and nozzle are substantially perpendicular to the underlying surface.

20 Claims, 11 Drawing Sheets

Related U.S. Application Data

(60) Provisional application No. 62/570,734, filed on Oct. 11, 2017.

(52) U.S. Cl.
CPC ........ A01M 7/0042 (2013.01); A01M 7/0057 (2013.01); B05B 1/20 (2013.01)

(58) Field of Classification Search
USPC .................................. 239/159–164, 166–169
See application file for complete search history.

(56) References Cited

U.S. PATENT DOCUMENTS

| | | | |
|---|---|---|---|
| 3,190,590 | A | 6/1965 | Eugene et al. |
| 3,478,967 | A | 11/1969 | Horton |
| 4,878,616 | A | 11/1989 | Richardson |
| 4,892,256 | A | 1/1990 | Brown et al. |
| 5,348,226 | A | 9/1994 | Heiniger et al. |
| 5,507,435 | A | 4/1996 | Benest |
| 6,293,475 | B1 | 9/2001 | Sobolik |
| 6,837,446 | B1 | 1/2005 | Jesse |
| 7,395,663 | B2 | 7/2008 | Thompson et al. |
| 7,878,422 | B2 | 2/2011 | Heiniger et al. |
| 8,688,331 | B2 | 4/2014 | Peterson et al. |
| 9,265,243 | B2 | 2/2016 | Kuphal |
| 10,499,561 | B2 | 12/2019 | Grotelueschen et al. |
| 2011/0153168 | A1 | 6/2011 | Peterson et al. |
| 2011/0266365 | A1 | 11/2011 | Hrnicek et al. |
| 2013/0119153 | A1 | 5/2013 | Hoeben |
| 2014/0074360 | A1 | 3/2014 | Rosa et al. |
| 2015/0098753 | A1 | 4/2015 | Kuphal |
| 2016/0015020 | A1* | 1/2016 | Needham ............ A01M 7/0089 239/159 |
| 2017/0027103 | A1 | 2/2017 | Grotelueschen et al. |
| 2017/0027152 | A1* | 2/2017 | Hiddema ............ A01M 7/0075 |
| 2017/0142957 | A1 | 5/2017 | Ballu |
| 2019/0075778 | A1 | 3/2019 | Barker et al. |

FOREIGN PATENT DOCUMENTS

| | | |
|---|---|---|
| EP | 2186405 A1 | 5/2010 |
| WO | 2011048593 A1 | 4/2011 |

OTHER PUBLICATIONS

Brazilian Office Action issued in Patent Application No. 1020180683594, dated Apr. 27, 2022, in 04 pages.
European Patent Office, Munich German; European Search Report; dated Dec. 17, 2018; pp. 1-5 Reference P24510EPORD1REG.
European Patent Office, Munich Germany: European Search Report; dated Dec. 19, 2018; pp. 1-7.
European Patent Office, Munich Germany; European Search Report; dated Dec. 17, 2018; pp. 1-5; Reference P24510EPORD2D1.
European Patent Office, Munich Germany; European Search Report; dated Dec. 12, 2018; pp. 1-5.
European Patent Office; Munich Germany; EP Search Report; European Patent Application No. 18199936.8; dated Mar. 8, 2019; pp. 1-7.

* cited by examiner

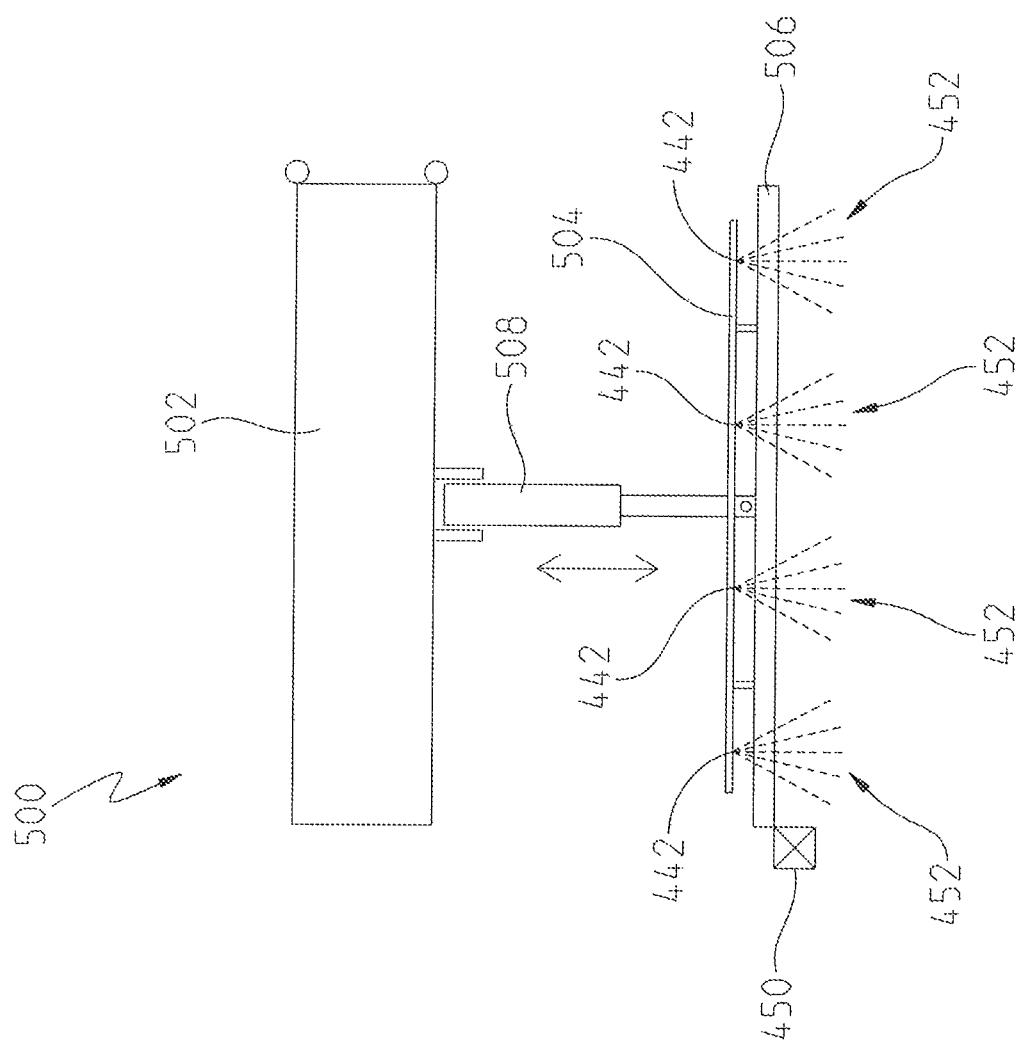

though each example and embodiment is listed separately,
HIGH RESOLUTION SPRAY SECTION HEIGHT CONTROL AND DYNAMIC NOZZLE HEIGHT ADJUSTMENT This application is a continuation application of U.S. patent application Ser. No. 16/034,785, filed Jul. 13, 2018, which claims the benefit of U.S. Provisional Patent Application Ser. No. 62/570,734, filed Oct. 11, 2017, the disclosures of which are hereby incorporated by reference in their entirety.

FIELD OF THE DISCLOSURE

The present disclosure relates to a sprayer, and in particular, to a sprayer control system for controlling sectional boom height of a sprayer.

BACKGROUND

Agricultural machines, such as a sprayer, may be used to spray a chemical substance such as an insecticide or pesticide on a ground surface or crop. These machines may include a frame with a rigid, elongated spray boom pivotably attached thereto on each side of the frame. Nozzles may be rigidly connected to the booms for spraying a chemical substance onto a field. Each boom may tilt relative to the frame during operation, particularly if an object is in the path of travel of the sprayer. Moreover, the frame and booms may be lifted together in unison to achieve different spray heights.

The machine can operate in accordance with a conventional control algorithm programmed to add some error in controlling spray heights to accommodate different terrain. As described, if an obstacle is in the path of travel of the spray near an end of the boom, then the entire boom is raised or tilted to avoid the obstacle. Since the boom is heavy and lacks flexibility, it is often difficult to perform a spraying operation over uneven terrain. In particular, hilly terrain can cause issues with losses in productivity because the chemical spray may not reach the ground or crop in the desired amount. Further, the chemical spray may drift due to the wind when the boom is raised and be sprayed on a non-targeted area. Therefore, conventional sprayers and their respective control systems are unable to manage boom height control due to changes in terrain and when obstacles are disposed in the path of travel of the sprayer. Moreover, conventional sprayers may not be able to control spray drift due to their current configurations.

Thus, there is a need for improved boom height control and drift control over conventional sprayers and spray control systems.

SUMMARY

In one embodiment of the present disclosure, a spray boom for spraying a fluid on an underlying surface includes a boom frame; a spray section coupled to the boom frame, the spray section including an elongated spray pipe configured to be fluidly coupled to a fluid source; a nozzle coupled to the spray pipe and configured to be fluidly coupled to the fluid source, the nozzle including a tip for spraying the fluid; an actuator coupled at one end to the boom frame and at an opposite end to the spray section, the actuator controllably extending and retracting to move the spray pipe and nozzle between a raised position and a lowered position; and a trip assembly coupled between the boom frame and actuator, the trip assembly biasing the spray section to a biased position in which the actuator and nozzle are substantially perpendicular to the underlying surface.

In one example of this embodiment, the actuator and spray section are pivotable between a first position and a second position, the first position being defined where the actuator and nozzle are substantially perpendicular to the underlying surface, and the second position being defined rearward of the boom frame. In a second example, the actuator and spray section are pivotable between a first position and a second position, the first position being defined forward of the boom frame and the second position being defined rearward of the boom frame; and the biased position being located between the first and second positions. In a third example, the trip assembly includes a spring and a damper. In a fourth example, the actuator is pivotably coupled to the boom frame.

In a fifth example, the spray section includes a nozzle body for holding the nozzle, a first link, and a second link, the first link being pivotably coupled at a first pivot to the boom frame and at a second pivot to the spray pipe, and the second link being pivotably coupled at a third pivot to the boom frame and at a fourth pivot to the spray pipe; wherein, the boom frame, the first link, the second link and the nozzle body form a four-bar linkage assembly. In a sixth example, the actuator is pivotably coupled between the boom frame and the first link, and the trip assembly is pivotably coupled between the boom frame and the second link. In a seventh example, the spray section is configured to pivot about the first and third pivots in a forward and rearward direction such that the nozzle body remains substantially square with the underlying surface during the pivotal movement.

In a further example, the spray boom includes a second boom frame coupled to the boom frame; a second spray section coupled to the second boom frame, the second spray section including a second elongated spray pipe configured to be fluidly coupled to the fluid source; a second nozzle coupled to the second spray pipe and configured to be fluidly coupled to the fluid source, the second nozzle including a tip for spraying the fluid; a second actuator coupled at one end to the second boom frame and at an opposite end to the second spray section, the second actuator controllably extending and retracting to move the second spray pipe and second nozzle between a raised position and a lowered position; and a second trip assembly coupled between the second boom frame and the second actuator, the second trip assembly biasing the second spray section to a biased position in which the second actuator and second nozzle are substantially perpendicular to the underlying surface.

In another embodiment of this disclosure, a spray boom includes a center frame; a boom assembly coupled to the center frame, the boom assembly comprising a first boom frame; a spray pipe coupled to the first boom frame, the spray pipe being in fluid communication with a fluid source for supplying fluid to be sprayed on a target; an actuator coupled to the first boom frame, the actuator being operably controlled between an extended position and a retracted position; a tube assembly coupled to the first boom frame, the tube assembly comprising a first tube and a second tube, the second tube being telescopically coupled to the first tube; and a nozzle configured to spray the fluid on the target, the nozzle being coupled to the second tube; wherein, the second tube is coupled to the actuator such that as the actuator moves between its extended position and retracted position, the second tube moves relative to the first tube.

In one example of this embodiment, the spray boom may also include a controller disposed in electrical communication with the actuator for operably controlling the actuator between its extended position and retracted position; and a sensor disposed in electrical communication with the controller and configured to detect a distance between the nozzle and the target; wherein, the sensor communicates the distance to the controller, and the controller operably controls movement of the actuator until the distance satisfies a target distance. In a second example, the controller operably controls movement of the second tube into and out of the first tube until the distance satisfies the target distance.

In a third example, the boom assembly includes a second boom frame; a second spray pipe is coupled to the second boom frame, the second spray pipe being in fluid communication with the fluid source; a second actuator coupled to the second boom frame, the second actuator being operably controlled between an extended position and a retracted position; a second tube assembly coupled to the second boom frame, the second tube assembly comprising a first tube and a second tube, the second tube being telescopically coupled to the first tube; and a second nozzle configured to spray the fluid on the target, the second nozzle being coupled to the second tube of the second tube assembly; wherein, the second tube of the second tube assembly is coupled to the second actuator such that as the second actuator moves between its extended position and retracted position, the second tube of the second tube assembly moves relative to the first tube of the second tube assembly; further wherein, the first actuator and second actuator are operably controlled independently of one another.

In a fourth example, the spray boom may include a second spray pipe coupled to the first boom frame, the second spray pipe being in fluid communication with the fluid source; a second actuator coupled to the first boom frame, the second actuator being operably controlled between an extended position and a retracted position; a second tube assembly coupled to the first boom frame, the second tube assembly comprising a first tube and a second tube, the second tube being telescopically coupled to the first tube; and a second nozzle configured to spray the fluid on the target, the second nozzle being coupled to the second tube of the second tube assembly; wherein, the second tube of the second tube assembly is coupled to the second actuator such that as the second actuator moves between its extended position and retracted position, the second tube of the second tube assembly moves relative to the first tube of the second tube assembly; further wherein, the first actuator and second actuator are operably controlled independently of one another.

In a further embodiment of this disclosure, a spray boom includes a boom frame; a spray section coupled to the boom frame, the spray section including a flexible member and a nozzle, the nozzle being coupled to the flexible member and configured to be fluidly coupled to a fluid source, the nozzle including a tip for spraying a fluid from the fluid source onto a target; and an actuator coupled at one end to the boom frame and at an opposite end to the flexible member, the actuator controllably moving between an extended position and a retracted position; wherein, movement of the actuator between its extended and retracted positions flexes the flexible member to adjust a distance between the nozzle and the target.

In one example of this embodiment, the flexible member includes a spray pipe configured to be fluidly coupled to the fluid source, the nozzle being fluidly coupled to the spray pipe for receiving fluid to be sprayed on the target. In a second example, the spray pipe includes a spray pipe coupled to the boom frame and configured to be fluidly coupled to the fluid source; and a hose fluidly coupled between the spray pipe and the nozzle for feeding the fluid from the spray pipe to the nozzle; wherein the flexible member is vertically offset from the spray pipe. In a third example of this embodiment, the spray boom may include a controller disposed in electrical communication with the actuator for operably controlling the actuator between its extended position and retracted position; and a sensor disposed in electrical communication with the controller and configured to detect the distance between the nozzle and the target; wherein, the sensor communicates the distance to the controller, and the controller operably controls movement of the actuator until the distance satisfies a target distance.

In another example, in the extended position the flexible member is flexed toward the target to decrease the distance, and in the retracted position the flexible member is flexed away from the target to increase the distance. In yet another example, the spray boom includes a second actuator coupled at one end to the boom frame and at an opposite end to the flexible member, the second actuator controllably movable between an extended position and a retracted position; and a second nozzle being coupled to the flexible member and configured to be fluidly coupled to the fluid source, the second nozzle including a tip for spraying the fluid from the fluid source onto the target; wherein, movement of the second actuator between its extended and retracted positions flexes the flexible member to adjust a distance between the second nozzle and the target.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5 is a schematic of an independent section of a sprayer boom frame with an actuator for spray section height control;

Corresponding reference numerals are used to indicate corresponding parts throughout the several views.

DETAILED DESCRIPTION

Figure 1:
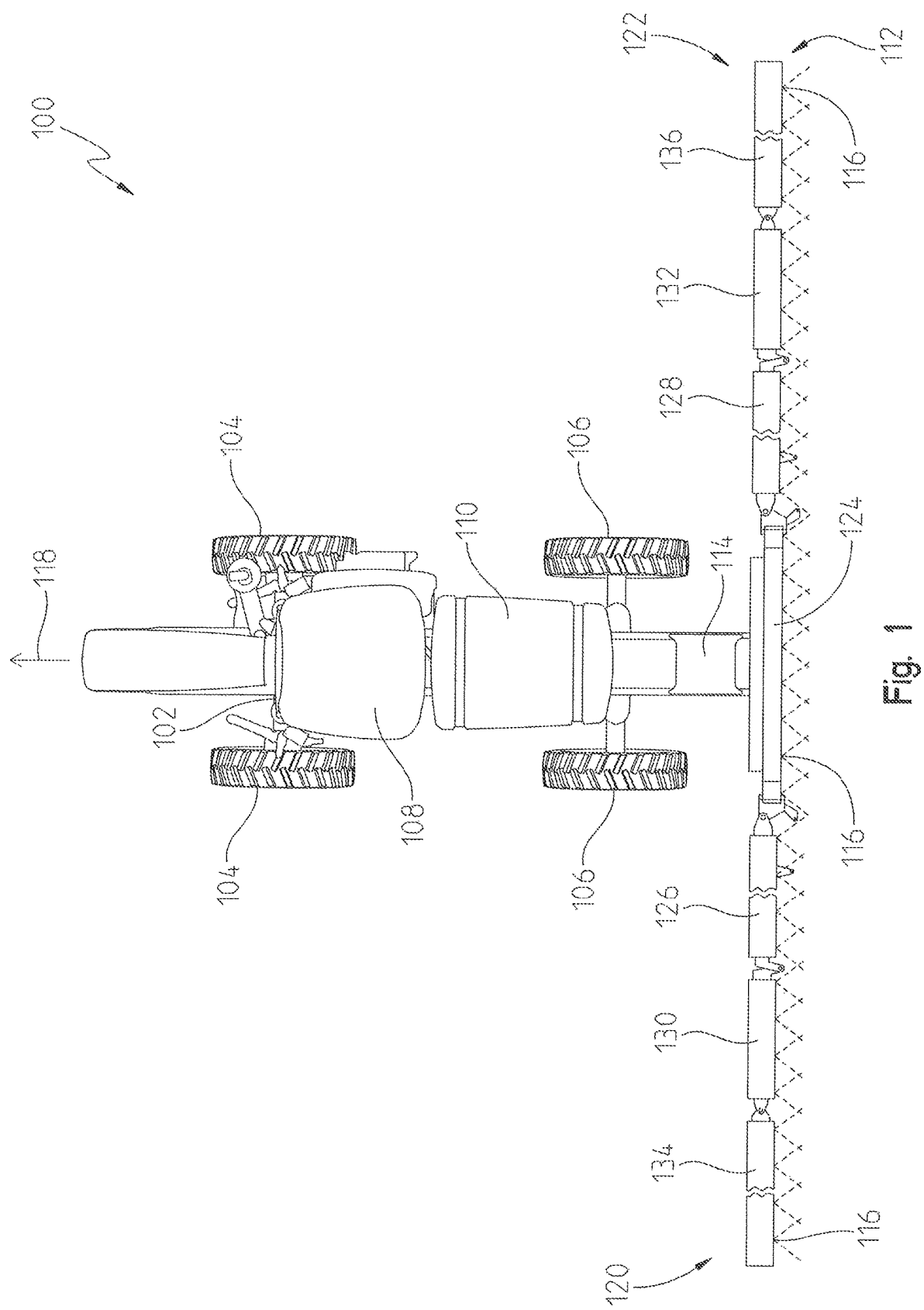
FIG. 1 is a top view of a sprayer system attached to a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, an example of a vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In the illustrated embodiment of FIG. 1, the vehicle is a towed sprayer or a self-propelled agricultural sprayer 100 including a vehicle main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A tank 110 may be mounted to the frame 102 or another frame (not shown) which is attached to the main frame 102. The tank 110 may contain a spray liquid or other substance to be discharged during a spraying operation. Alternatively, the tank may store a dry nutrient.

A fixed or floating center frame 114 is coupled to a front or a rear of the main frame 102. In FIG. 1, the center frame 114 is shown coupled to the rear of the main frame 102. The center frame 114 may support an articulated folding spray boom assembly 112 that is shown in FIG. 1 in its fully extended working position for spraying a field. In other examples, the spray boom assembly 112 may be mounted in front of the agricultural sprayer 100.

A plurality of spray nozzles 116 can be mounted along a fluid distribution pipe or spray pipe (not shown) that is mounted to the spray boom assembly 112 and fluidly coupled to the tank 110. Each nozzle 116 can have multiple spray outlets, each of which conducts fluid to a same-type or different-type of spray tip. The nozzles 116 on the spray boom assembly 112 can be divided into boom frames or wing structures such as 124, 126, 128, 130, 132, 134, and 136 (or collectively "spray section(s)"). In FIG. 1, the plurality of groups or sections may include a center boom frame 124 which may be coupled to the center frame 114. Although not shown in FIG. 1, a lift actuator may be coupled to the center frame 114 at one end and to the center boom frame 124 at the opposite end for lifting or lowering the center boom frame 124. In an alternative embodiment, the plurality of nozzles may include a dry nutrient air boom drop.

The spray boom assembly 112 may be further divided into a first or left boom 120 and a second or right boom 122. In FIG. 1, the first boom 120 is shown on a left side of the spray boom assembly 112, and the second boom 122 is depicted on the right side thereof. In some instances, a left-most portion of the center boom frame 124 may form part of the first boom 120 and a right-most portion may form part of the second boom 122. In any event, the first boom 120 may include those boom frames which are disposed on a left-hand side of the spray boom assembly 112 including a first inner boom frame 126 (or commonly referred to as a "left inner wing"), a first outer boom frame 130 (or commonly referred to as a "left outer wing"), and a first breakaway frame 134. Similarly, the second boom 122 may include those boom frames which are disposed on a right-hand side of the spray boom assembly 112 including a second inner boom frame 128 (or commonly referred to as a "right inner wing"), a second outer boom frame 132 (or commonly referred to as a "right outer wing"), and a second breakaway frame 136. Although seven boom frames are shown, there may any number of boom frames that form the spray boom assembly 112.

As shown in FIG. 1, the first boom frame 126 may be pivotally coupled to the center boom frame 124 via various mechanical couplings. Other means for coupling the first boom frame 126 to the center boom frame 124 may be used. Similarly, the first outer boom frame 130 may be coupled to the first inner boom frame 126, and the first breakaway frame 134 may be coupled to the first outer boom frame 130. In some cases, these connections may be rigid connections, whereas in other embodiments the frames may be pivotably coupled to one another. Moreover, the second inner boom frame 128 may be coupled to the center boom frame 124, and the second outer boom frame 132 may be coupled to the second inner boom frame 128. Likewise, the second breakaway frame 136 may be coupled to the second outer boom frame 136. These couplings may be pivotal connections or rigid connections depending upon the type of boom.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

As described above, one of the challenges with a conventional boom is that actuating the tilt cylinder may cause the entire boom, i.e., each of its individual frames, to raise or lower with respect to the ground. As this happens, the distance between each nozzle and the ground changes and may result in the distance exceeding a target distance. In effect, this can cause the spray from each nozzle to drift into non-targeted areas or not reach desired targets. The spraying operation can be ineffective and non-productive.

Figure 2:
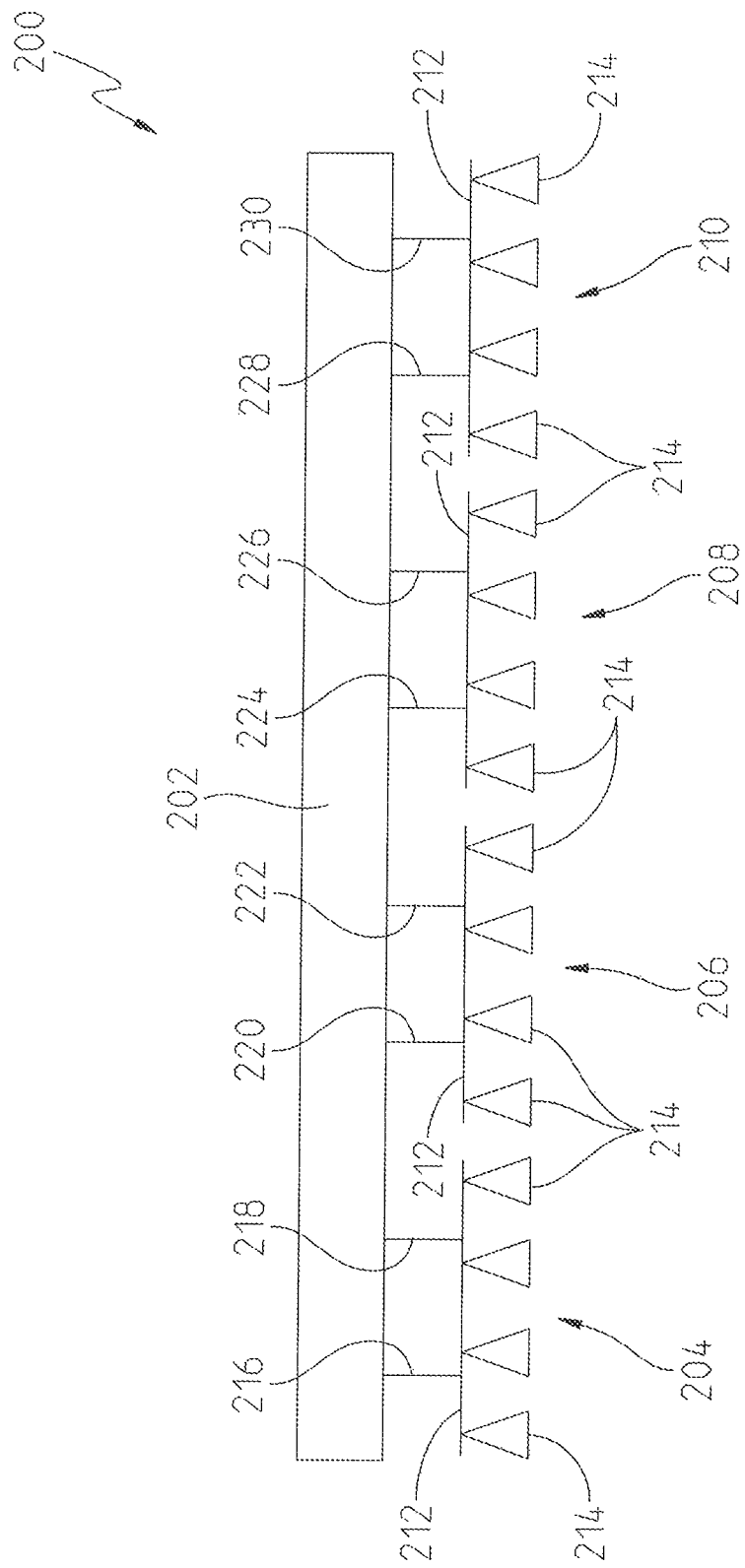
FIG. 2 is a schematic of a sprayer boom frame with a plurality of sections configured for independent section boom height control.
Figure 3:
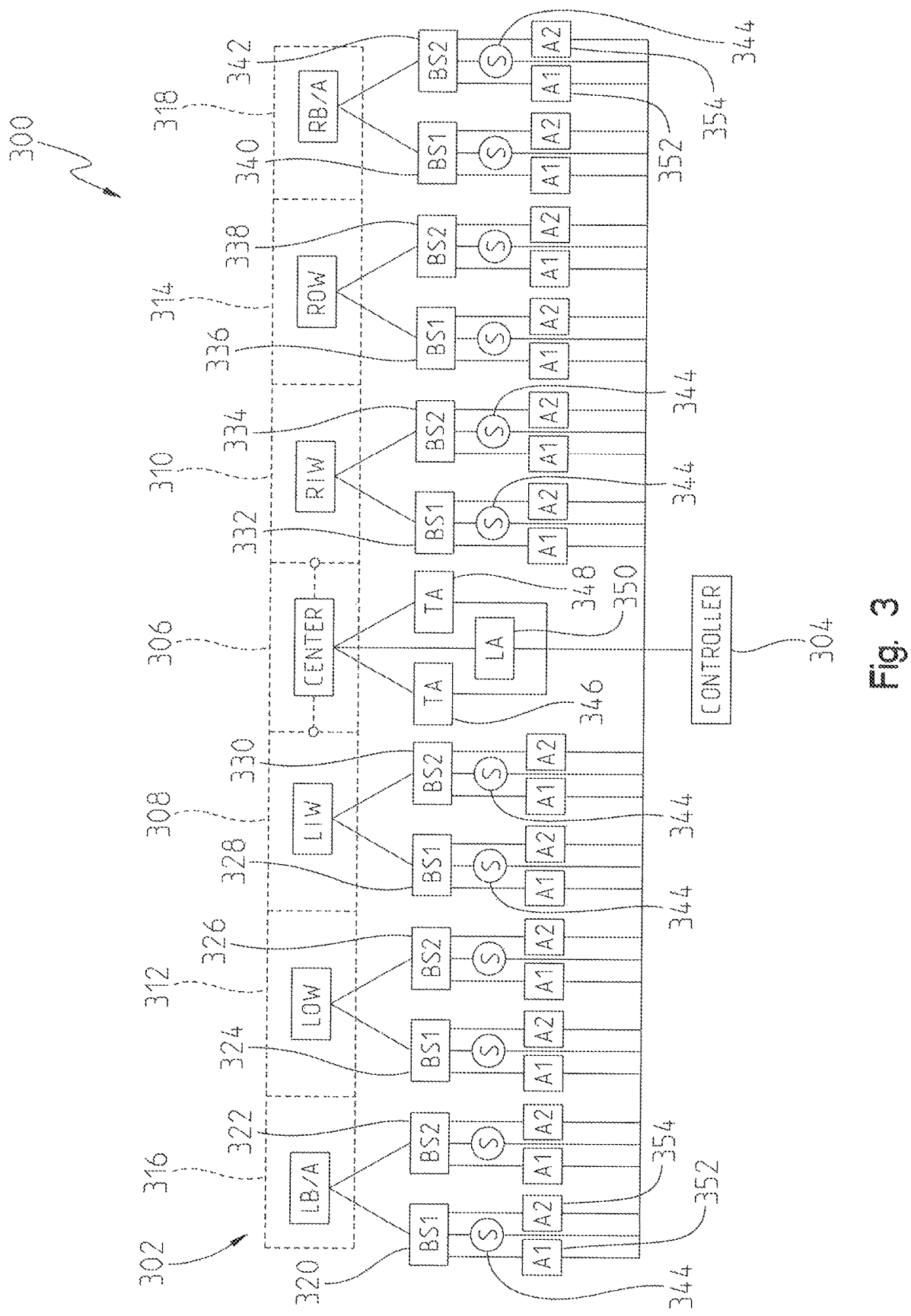
FIG. 3 is a schematic of a sprayer control system for controlling independent section boom height.

Thus, this disclosure provides one or more embodiments of sectional boom height control for individual sections of a sprayer. In this disclosure, the use of tilt control via the aforementioned tilt actuators may be combined with the use of vertical movement control at each respective boom section. Referring to FIGS. 1-3, each boom frame may include one or more individual boom sections. In other words, the first inner boom frame 126 may include one or more boom sections to which a plurality of nozzles is coupled. In FIG. 2, for example, one embodiment of a spray boom assembly 200 is illustrated. The spray boom assembly 200 may be similar to the spray boom 120, 122 of FIG. 1. Here, the spray boom assembly 200 includes a boom frame 202 similar to the various boom frames 124, 126, 128, 130, 132, 134, 136 shown in FIG. 1. The boom frame 202 may include a first boom section 204, a second boom section 206, a third boom section 208, and a fourth boom section 210. Each boom section may include a spray pipe 212 which is fluidly coupled to a fluid source such as the tank 110. Moreover, a plurality of nozzles 214 are fluidly coupled to the respective spray pipe 212.

In the illustrated embodiment of FIG. 2, the first boom section 204 may include a first actuator 216 and a second actuator 218. The first actuator 216 may be offset or spaced from the second actuator 218. For example, the first actuator 216 may be coupled between the boom frame 202 and the spray pipe 212 near a first end of the spray pipe 212, and the second actuator 218 may be coupled between the boom frame 202 and the spray pipe 212 near a second or opposite end of the spray pipe 212. Each of the two actuators may be electrically coupled to a main controller which controls actuation of both. The controller may be configured to independently control each actuator. The actuators may be powered electrically, hydraulically, mechanically, pneumatically, or any combination thereof. The same may be said for the tilt actuators, lift actuators, and any other actuator described herein.

Similar to the first boom section 204, the second boom section 206 may also include a first actuator 220 and a second actuator 222. The two actuators may be spaced from one another such that the first actuator 220 can vertically control the position and orientation of one end of the spray pipe 212, whereas the second actuator 222 can vertically control the position and orientation of the opposite end of the spray pipe 212. Moreover, the first and second actuators may also be electrically coupled to the controller (not shown) such that the controller is able to actuate the actuators of the second boom section 206 independent of one another and independent of the first and second actuators of the first boom section 204.

The third boom section 208 further includes a first actuator 224 and a second actuator 226 as shown in FIG. 2. The two actuators may be spaced or offset from one another such that the first actuator 224 is able to raise or lower one end of the spray pipe 212, whereas the other actuator 226 is able to raise or lower the opposite end of the spray pipe 212. A main controller (not shown) may further electrically control the first and second actuators independently of one another and independent of the other actuators of the first and second boom sections.

The fourth boom section 210 may also include a first actuator 228 and a second actuator 230. The two actuators may be spaced from one another such that the first actuator 228 can vertically control the position and orientation of one end of the spray pipe 212, whereas the second actuator 230 can vertically control the position and orientation of the opposite end of the spray pipe 212. Moreover, the first and second actuators may also be electrically coupled to and controlled by a main controller (not shown) such that the controller is able to actuate the actuators of the fourth boom section 210 independent of one another and independent of the actuators of the other three boom sections.

In FIG. 3, one embodiment of a control system 300 is shown for providing the improved boom section height control and drift control. In this system 300, a controller 304 may be provided for controlling the sprayer and its operation. The controller 304 may include a memory unit for storing algorithms, software, lookup tables, and the like. A processor within the controller 304 may execute instructions via the algorithms, software, etc. for controlling the sprayer. The controller 304 may be any type of controller. It may be an engine controller, a transmission controller, a machine or vehicle controller, or any other known type of controller. The controller 304 may be capable of communicating with different components on the sprayer, and it may further send or transmit wireless signals to a remote location such as a database, server, etc. Moreover, the controller 304 may be capable of receiving communications wirelessly from a remote location.

The sprayer may be similar to the one illustrated in FIGS. 1-2. The sprayer may include a boom assembly 302 having a center boom frame 306, a first inner boom frame 308 (or left inner wing), a second inner boom frame 310 (or right inner wing), a first outer boom frame 312 (or left outer wing), a second outer boom frame 314 (or right outer wing), a first breakaway frame 316 (or left breakaway), and a second breakaway frame 318 (or right breakaway). The first inner boom frame 308, the first outer boom frame 312, and the first breakaway frame 316 may form part of a first boom which is coupled to a center frame or center boom frame 306. The first boom may be pivoted with respect to this center boom frame 306 via a first tilt actuator 346. Likewise, the second inner boom frame 310, the second outer boom frame 314, and the second breakaway frame 318 may form part of a second boom which is coupled to a center frame or center boom frame 306. The second boom may be pivoted with respect to this center boom frame 306 via a second tilt actuator 348.

The center boom frame 306 may be raised and lowered relative to the ground via a lift actuator 350. In some instances, as the center boom frame 306 is raised and lowered by the lift actuator 350, the first and second booms (and thus each boom frame) is also raised and lowered along with the center boom frame 306.

As also shown in FIG. 3, each boom frame may include a plurality of boom sections similar to the one described with respect to FIG. 2. For example, the first breakaway frame 316 may include a first boom section 320 and a second boom section 322. The first outer boom frame 312 may include a first boom section 324 and a second boom section 326. The first inner boom frame 308 may include a first boom section 328 and a second boom section 330. The center boom frame 306 is not shown having any boom sections, but the center boom frame 306 may include one or more boom sections. The second inner boom frame 310 may include a first boom section 332 and a second boom section 334. The second outer boom frame 314 may also include a first boom section 336 and a second boom section 338. Lastly, the second breakaway frame 318 may include a first boom section 340 and a second boom section 342. While each boom frame is described and shown as having two boom sections, in other embodiments the boom frames may have any number of boom sections. Moreover, while a total of seven boom frames are shown in FIG. 3, other embodiments may include one or more boom frames.

Each boom section illustrated in FIG. 3 is shown having a first actuator 352, a second actuator 354 and a sensor 344 coupled thereto. The distance between the sensor(s) and the target (i.e., ground or crop canopy) may be detected by the sensors 344 and communicated to the controller 304. As such, each sensor 344 is disposed in electrical communication with the controller 304. The sensors 344 may be an ultrasonic sensor, a laser-based crop height sensor, a camera-based crop height sensor, or any other known sensor capable of detecting a distance between two objects. Sensors 344 may also be disposed at each end of the first boom and second boom. Conventional sprayer systems may include a single sensor on each boom frame, whereas as shown in FIG. 3 there may be a sensor located on each boom section. Thus, each boom frame may include a plurality of sensors mounted thereon.

The individual spray section actuators are able to provide positive feedback with which the height of each boom section is measured and adjusted independently. In other words, the first and second actuators on the first boom section 320 of the breakaway frame 316 may be controlled independently of one another by the controller 304. The sensor(s) 344 located on the first boom section 320 may communicate the position of each actuator and the corresponding height of the boom section. At the same time, the controller 304 may be able to operably control the section height of the second boom section 322 of the first breakaway frame 316. Moreover, the controller 304 may be able to control the actuators on each boom section of the other boom frames at the same time, and thus more precise control along the entire spray boom assembly is achievable. In combination with tilt control and lift control, the controller 304 is better able to control the height each nozzle is from the ground or crop as the sprayer moves about different terrain.

Although spray pipes and nozzles are not shown in FIG. 3, each spray section may include a plurality of nozzles coupled thereto for spraying a substance onto a crop or surface. The substance may be stored in a tank as described with respect to FIG. 1, and distributed to each spray section via a distribution or spray pipe. Other ways of fluidly coupling each nozzle to a fluid source may be used as known by the skilled artisan.

In a different embodiment of FIG. 3, the control system 300 may further be capable of controlling the individual boom sections without the need for a tilt actuator. In other words, the individual boom section actuators 352, 354 may be used for tilting or orienting each boom section at an angle that would otherwise be achieved via the tilt actuators. In this embodiment, neither tilt actuator is present and the controller 304 is able to tilt or angularly dispose each boom through the use of the different section actuators.

Figure 4:
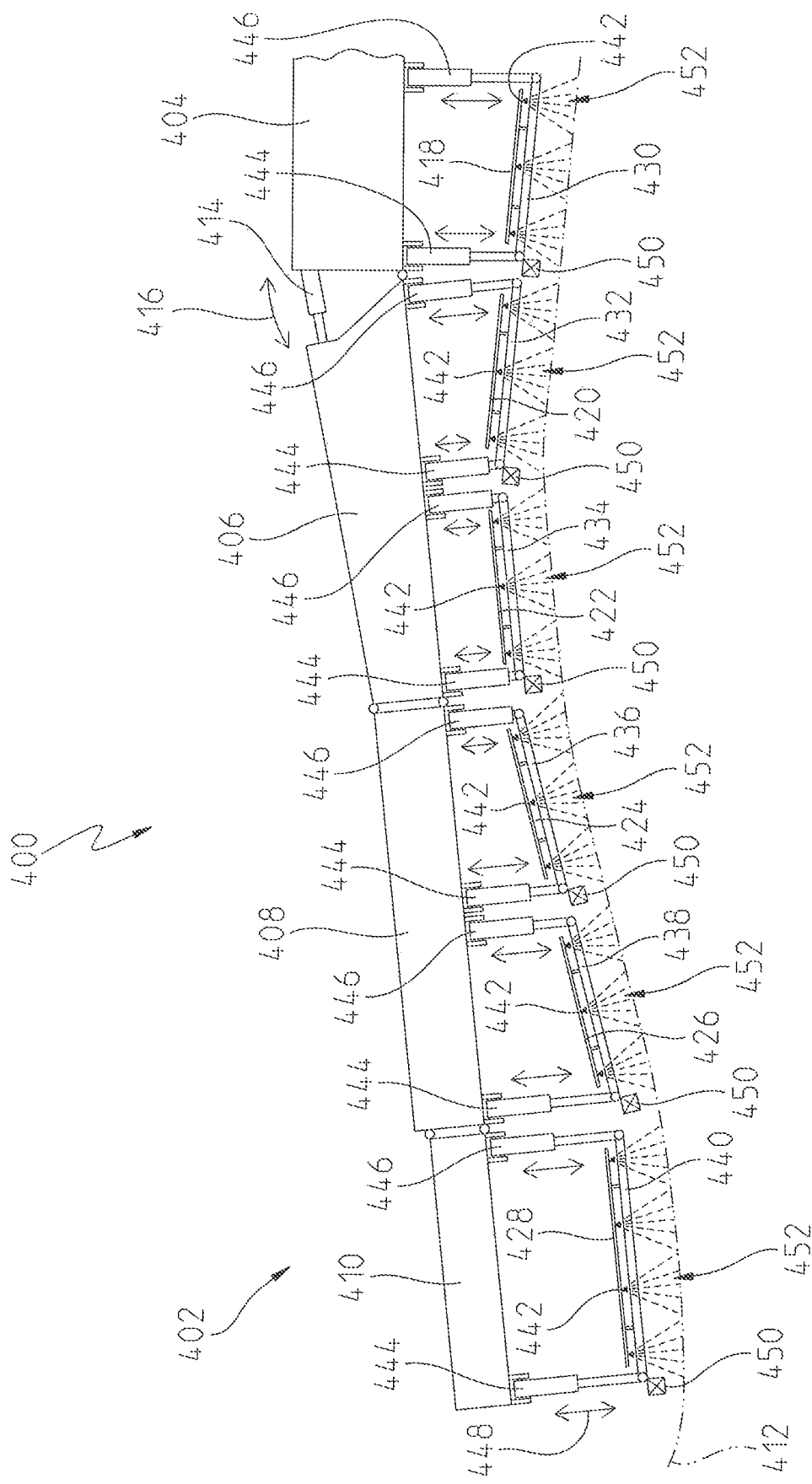
FIG. 4 is a schematic of another embodiment of a sprayer boom frame with a plurality of sections configured for spray section height control.

Referring to FIG. 4, another embodiment of a spray boom 400 is shown. In this embodiment, only one side of the spray boom 400 is shown for illustrative purposes, but the same teachings and principles may be applied to the opposite side thereof. The spray boom 400 may be hitched or otherwise attached to either a front or rear of a work vehicle such as a tractor or other agricultural machine. The spray boom 400 may extend transversely to the direction of travel, i.e., a forward or reverse direction. The spray boom 400 may include a boom assembly 402 that extends outwardly from a center boom frame 404. The boom assembly 402 may include a plurality of boom frames including a first boom frame 406, a second boom frame 408, and a third boom frame 410. The first boom frame 406 may be referred to as an inner wing or inner wing boom structure. The second boom frame 408 may be referred to as an outer wing or outer wing boom structure. Lastly, the third boom frame 410 may be referred to as a breakaway or breakaway boom structure.

Each boom frame may be coupled to adjacent boom frames. For instance, the first boom frame 406 may be pivotably coupled to the center boom frame 404 at a pivot location. Moreover, a tilt actuator 414 may pivot the boom assembly 402 relative to the center boom frame 404 in a pivot direction 416.

The spray boom 400 traverses over a ground or crop canopy 412 and is able to perform a spraying operation by spraying a substance from a plurality of nozzles 442. Each nozzle 442 may include a nozzle body affixed to a spray pipe, and the individual nozzle body may include a tip having a desired tip size for delivering a spray 452 onto the ground or crop canopy 412. The spray 452 may include a fertilizer, insecticide, pesticide, or any other known substance capable of being sprayed or discharged from one of the nozzles 442.

Each nozzle 442 is maintained at a certain height from the ground or crop canopy 412. The height may be referred to as a target height, and the target height may be operably stored or otherwise communicated to a controller (i.e., controller 304). The actual height of each nozzle or spray pipe may be detected by one or more sensors 450 located on the spray pipe, spray pipe support, or boom frame. Each sensor 450 may be in electrical communication with the controller for communicating the actual height to the controller. In effect, the controller may be programmed with a spray height control algorithm to control the actual height to be at or within a threshold limit of the target height. For example, if the target height is 20 inches and the threshold range or limit is +/−3 inches, the controller may determine if the actual height is between 17 and 23 inches. If not, the controller may adjust the height of the spray pipe or boom frame until the actual height satisfies the target height. Many conventional sprayers lack flexibility and increased control to achieve the target height across the entire length of the boom, as described above. In this embodiment, however, high resolution spray section height control may be achieved and will now be described with reference to FIG. 4.

The boom assembly 402 of FIG. 4 includes the plurality of boom frames. Each boom frame is provided with its own spray pipe which may be adjustably controlled via actuators to move up or down relative to the boom frame and in effect adjust the distance from the ground or crop canopy 412. The actuators may be a linear actuator, for example, and each may be controlled mechanically, electrically, hydraulically, pneumatically, or a combination thereof.

With reference to the center boom frame 404, it may include a first spray pipe 418 that depends downwardly from the center frame structure. A plurality of nozzles 442 may be coupled to the first spray pipe 418 for producing a spray 452. The first spray pipe 418 may further include a first spray pipe support 430 which is coupled to one or more actuators. In FIG. 4, the first spray pipe support 430 may be coupled to a first actuator 444 at one end and to a second actuator 446 at or near an opposite end thereof. The first actuator 444 and second actuator 446 may be spaced from one another by a predetermined distance. Each actuator may be operably controlled by the controller to adjust the spray height of each nozzle 442 on the first spray pipe 418. The first and second actuators may be controlled to extend and retract to thereby move the first spray pipe 418 and first spray pipe support 430 in an upward and downward movement relative to the center boom frame 404. This is shown in FIG. 4 via the up and down arrow 448.

The first actuator 444 and the second actuator 446 may include a rod that extends and retracts within an outer cylinder body, for example. The end of each rod may be coupled to the first spray pipe support 430, whereas the outer cylinder body is coupled to the center boom frame 404. Although not shown in FIG. 4, the center boom frame 404 may also be capable of raising or lowering via a lift actuator. An example of this is described in FIG. 3 above.

In another example of FIG. 4, it may be possible for the center boom frame 404 to not include either of the first and second actuators. Instead, the lift actuator may be operably controlled by the controller to adjust the height of the spray pipe 418 and nozzles 442 relative to the ground or crop canopy 412.

The above description of the center boom frame 404 may be similar to that of the other boom frames. The first boom frame 406, however, may include a first boom section and a second boom section. The first boom section may include a spray pipe 420 and a spray pipe support 432. One or more nozzles 442 may be coupled to the spray pipe 420 for discharging a spray 452 onto the ground or crop canopy 412. The spray pipe 420 and spray pipe support 432 may be raised and lowered via a first actuator 444 and a second actuator 446, as shown in FIG. 4. In addition, the second boom section may include a spray pipe 422 and a spray pipe support 434 to which a first actuator 444 and a second actuator 446 are coupled. The spray pipe 422 and spray pipe support 434 may be operably controlled in an upward and downward motion via the actuators. The controller may be further capable of controlling the two different boom sections independently of one another. Moreover, the boom sections on the first boom frame 406 may be operably controlled independently of the spray pipe 418 on the center boom frame 404. This allows for increased flexibility and dynamic spray height control as the spray boom 400 traverses across a field of uneven terrain.

Like the first boom frame 406, the second boom frame 408 may also include two or more boom sections. For instance, the first boom section may include a spray pipe 424 and a spray pipe support 436. A first actuator 444 and a second actuator 446 may be coupled between the second boom frame 408 and the spray pipe support 436. The two actuators may further be spaced from one another so as to tilt or orient the spray pipe 424 and nozzles 442 to be substantially perpendicular to the ground or crop canopy 412. During operation, the first and second actuators may raise and lower the spray pipe 424 and spray pipe support 436 to maintain the nozzles 442 at a desired spray height.

The second boom frame 408 may also include a second boom section which includes a spray pipe 426 and a spray pipe support 438. A pair of actuators 444, 446 are coupled to the spray pipe support 438 and the second boom frame 408 to raise and lower the spray pipe 426 and the spray pipe support 438. The first and second spray sections of the second boom frame 408 may be operably controlled independently of one another. Moreover, each spray section of the boom assembly 402 may be controlled independently from one another.

The third boom frame 410 may also include a spray pipe 428 and a spray support pipe 440. A plurality of nozzles 442 may be coupled to the spray pipe 428 for producing a spray 452. A first actuator 444 and a second actuator 446 may further be coupled between the boom frame 410 and the spray pipe support 440 in order to raise and lower the spray pipe 428 and spray pipe support 440. The controller may operably control the actuators to adjust the spray height between the nozzles 442 and the ground or crop canopy 412. Further, the controller may be able to control the spray height of the spray pipe 428 independently of the other spray pipes of the boom assembly 402.

Although not shown in FIG. 4, a tank may be fluidly coupled to each of the spray pipes via a distribution tube or pipe. Flexible hoses may further couple the distribution tube to each spray pipe. The flexible hoses may adjust as the respective spray pipe is raised and lowered by the actuators.

In the embodiment of FIG. 4, a sensor 450 is located on each spray pipe or spray pipe support. In some cases, there may be more than one sensor 450 for each spray pipe or spray pipe support. For example, there may be one sensor 450 coupled to the spray pipe support at the location of the first actuator 444, and a second sensor 450 coupled to the spray pipe support at the location of the second actuator 446. The sensors may be any type of sensor including an ultrasonic sensor, a laser-based crop height sensor, a camera-based crop height sensor, or any other known sensor capable of detecting a distance between two objects. In any event, each sensor may be in electrical communication with the controller for detecting the spray height and communicating the same to the controller.

In FIG. 5, an alternative embodiment to the one depicted in FIG. 4 is shown. In FIG. 5, a spray boom 500 is shown having a boom frame 502. The boom frame 502 may be any one of the first boom frame 406, the second boom frame 408 or the third boom frame 410 of FIG. 4. In any event, the boom frame 502 may include a spray pipe 504 to which a plurality of nozzles 442 are attached. The spray pipe 504 may be further coupled and supported by a spray pipe support structure 506. Unlike the embodiment of FIG. 4 in which two actuators controllably moved the spray pipe and spray pipe support, the boom frame 502 in FIG. 5 only is shown with a single actuator 508. The actuator 508 may be coupled at one end to the boom frame 502 and at an opposite end to the spray pipe support structure 506. In effect, the actuator 508 may extend and retract a cylinder rod within a cylinder body, and in doing so the spray pipe 504 and nozzles 442 may be raised and lowered to adjust the spray height.

In a related embodiment, there may be a rotary actuator coupled between the rod of the actuator 508 and the spray pipe support structure 506. The rotary actuator may allow for tilting or orienting the spray pipe support structure 506 at an angle as desired.

Figure 6:
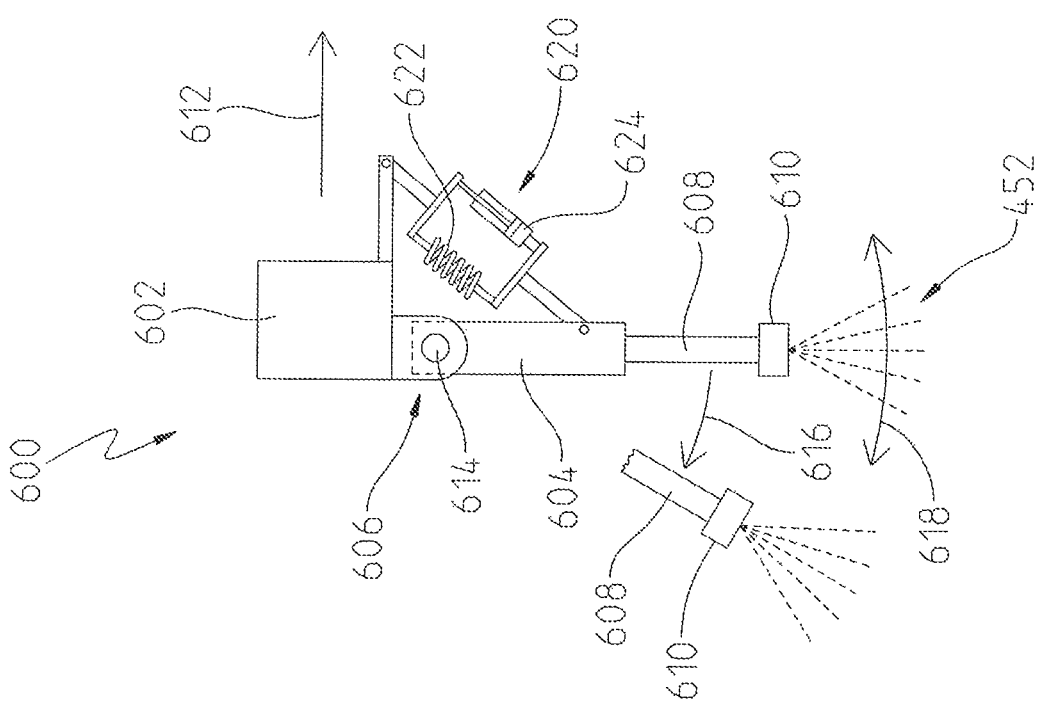
FIG. 6 is a schematic of one embodiment of a trip mechanism of a section of the sprayer boom frame of FIG. 4.

Referring now to FIGS. 4 and 6, the boom assembly 402 and its individual boom frames form an overhead boom support structure for supporting the boom sections and spray pipes. With the spray pipes and nozzles depending downwardly from the respective boom frame, the illustrative embodiment of FIG. 6 may provide a protective trip structure to the spray pipe in the event of contact with the ground or crop canopy. With the nozzles and sensors being sensitive to contact with the ground or crop canopy 412, it is desirable to prevent such contact. However, in some instances, it may be unavoidable to entirely prevent contact and thus a trip structure may be provided to allow the spray pipe and nozzles to pivot rearward or a combination of forward and rearward.

In FIG. 6, for example, a spray boom 600 or a portion thereof is shown having an overhead boom frame 602 acting as a support structure. For purposes of this example, the spray pipe is removed and instead a side view of a nozzle body 610 being attached to the spray pipe is shown. The nozzle body 610 may include a nozzle and nozzle tip for discharging a spray pattern 452 therefrom. The nozzle body 610 may be coupled to an actuator 604 having a cylinder rod 608 that extends and retracts within a cylinder body. The cylinder body may be coupled to the boom frame 602 via a pivot coupling 606. The actuator 604 and nozzle body 610 may pivot about a pivot point 614 defined by the coupling 606 of the actuator 604 to the boom frame 602. The actuator 604 and nozzle body 610 may pivot relative to the pivot point 614 in a substantially rearward direction along an arc path 616. Alternatively, the actuator 604 and nozzle body 610 may pivot relative to the pivot point 614 in both a forward and rearward direction along a second arc path 618. For purposes of this illustration, a forward travel direction of the spray boom 600 may be according to the arrow 612 in FIG. 6. Thus, if the spray boom 600 is traveling in the forward travel direction 612 and the spray pipe or nozzle body 610 contact the ground, crop canopy or other object, the spray pipe, actuator 604 and nozzle body 610 may pivot rearward along path 616. If the spray boom 600 is moving in a reverse travel direction, i.e., opposite the forward travel direction 612, and contact is made with the ground, crop canopy or other object, the spray pipe, actuator 604 and nozzle body 610 may pivot in a forward arcuate path 618.

By allowing the nozzle body 610 to pivot relative to the pivot point 614, the nozzle body 610 may be protected from damage if it or the spray pipe contacts the ground or crop canopy. In the event the spray pipe and nozzle body 610 pivot in a rearward direction or forward direction, the spray boom 600 may further include a trip structure 620 to return the nozzle body to its natural position and downward orientation relative to the ground. The trip structure 620 may include a combination of a spring and damper configuration. In FIG. 6, a spring 622 may be provided to extend as the spray pipe and nozzle body 610 move rearward, and a damper 624 may be provided in the event of a rearward arcuate motion. In each case, the spring 622 and damper 624 may be useful in acting together for returning the actuator 604, nozzle body 610 and spray pipe to its normal, downward position as shown in FIGS. 4 and 6.

Figure 7:
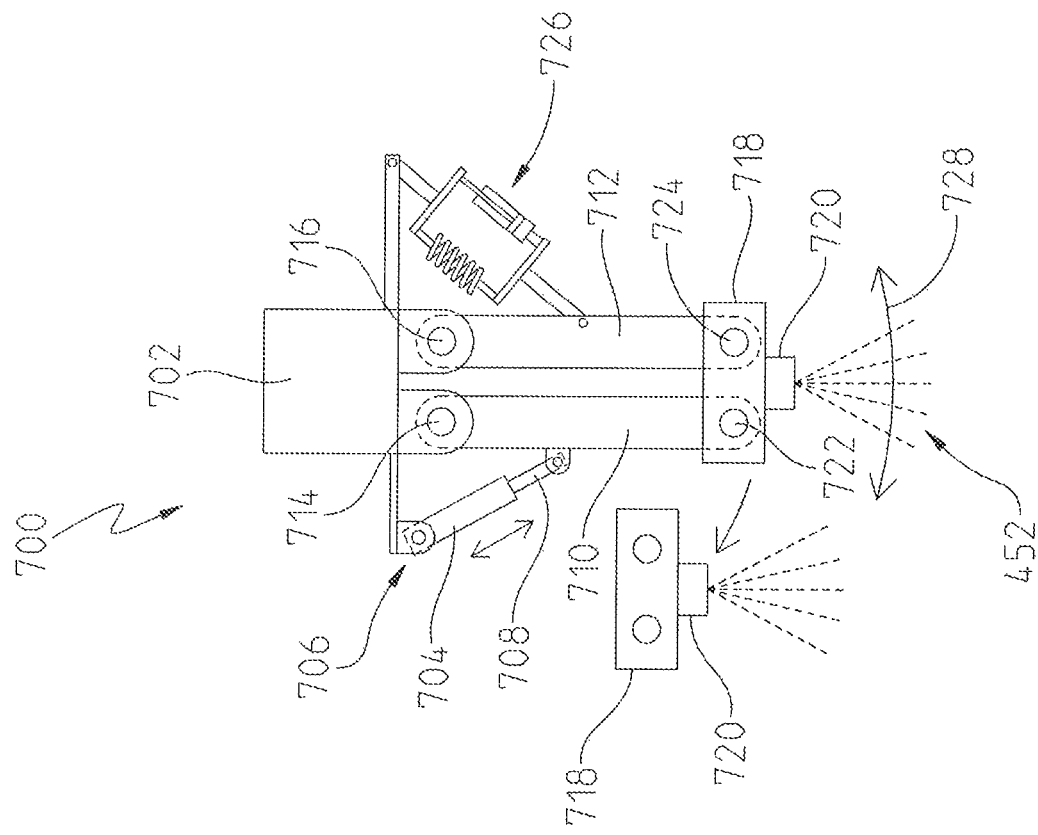
FIG. 7 is a schematic of another embodiment of a trip mechanism of a section of the sprayer boom frame of FIG. 4.

In FIG. 7, an illustrative embodiment of an alternative trip structure of a spray boom is shown. Here, a spray boom 700 again may include a boom frame 702 to which a nozzle body 718 and spray pipe (not shown) are attached. The nozzle body 718 may include one or more nozzles 720 with tips for discharging a spray pattern 452. In this example, a four bar linkage may be formed by an actuator 704, a first link 710, a second link 712, and a trip mechanism 726. The trip mechanism 728 may be formed by a combination of a spring/damper configuration similar to that of FIG. 6.

The actuator 704 may be coupled to the overhead boom frame 702 via a coupling 706. The actuator 704 may extend and retract a cylinder rod 708 in a fore and aft direction. The cylinder rod 708 may be pinned or otherwise coupled to the first link 710 as shown in FIG. 7. The first link 710 may have a first end coupled to the boom frame 702 at a first pivot 714 and a second end coupled to the nozzle body 718 at a second pivot 722. Moreover, the second link 712 may have a first end coupled to the boom frame 702 at a third pivot 716 and a second end coupled to the nozzle body 718 at a fourth pivot 724. The first and second links are therefore capable of pivoting relative to the boom frame 702 via the first and third pivots. Moreover, the first and second links are capable of pivoting relative to the nozzle body 718 via the second and fourth pivots. As such, the nozzle body is capable of pivoting along an arcuate path identified by arrow 726 in FIG. 7.

The trip mechanism 726 is capable of performing similar to the trip mechanism 620 of FIG. 6. In particular, the trip mechanism 726 may include a spring that extends as the nozzle body 718 pivots along the arcuate path 728 in a rearward direction (i.e., to the left in FIG. 7). As the spring extends, it biases the second link 712 to return to its normal downward position. The trip mechanism 726 may be coupled at one end to the boom frame 702 and at an opposite end to the second link 712. Thus, the trip mechanism 726 may act or bias the second link 712 to return to its normal position. Likewise, if the nozzle body pivots in a forward direction, i.e., to the right in FIG. 7, a damper of the trip mechanism 728 may urge the second link 712 to return to its normal position. The spring and damper may function together in unison to return the nozzle to its normal position.

In a related embodiment, the actuator 704 may function with a hydraulic accumulator to replace the trip mechanism 726 of FIG. 7 and return the nozzle to its normal position.

One benefit of the four-bar linkage of FIG. 7 is that the nozzle body 718 is able to pivot along the arcuate path 726 upon contact with the ground, crop canopy or other object, but as it does move the spray pipe structure and nozzle body 718 remain oriented such that the nozzles 720 are pointing substantially downward toward the ground or crop canopy. As such, it is easier to maintain a desired or target spray height even as the spray boom 700 travels over uneven terrain.

In the embodiment of FIG. 7, the actuator 704 may be angularly disposed relative to the first link 710 in the normal, downward position as shown. As the cylinder rod 708 extends and retracts, the actuator 704 may be able to pivot the links relative to the first and third pivots to alter the height of the nozzles 720 relative to the ground. Thus, the actuator 704 may be controlled by the controller to adjust the position and height of the spray pipe structure and nozzle body 718 relative to the ground or crop canopy to maintain or achieve a desired spray height.

Figure 8:
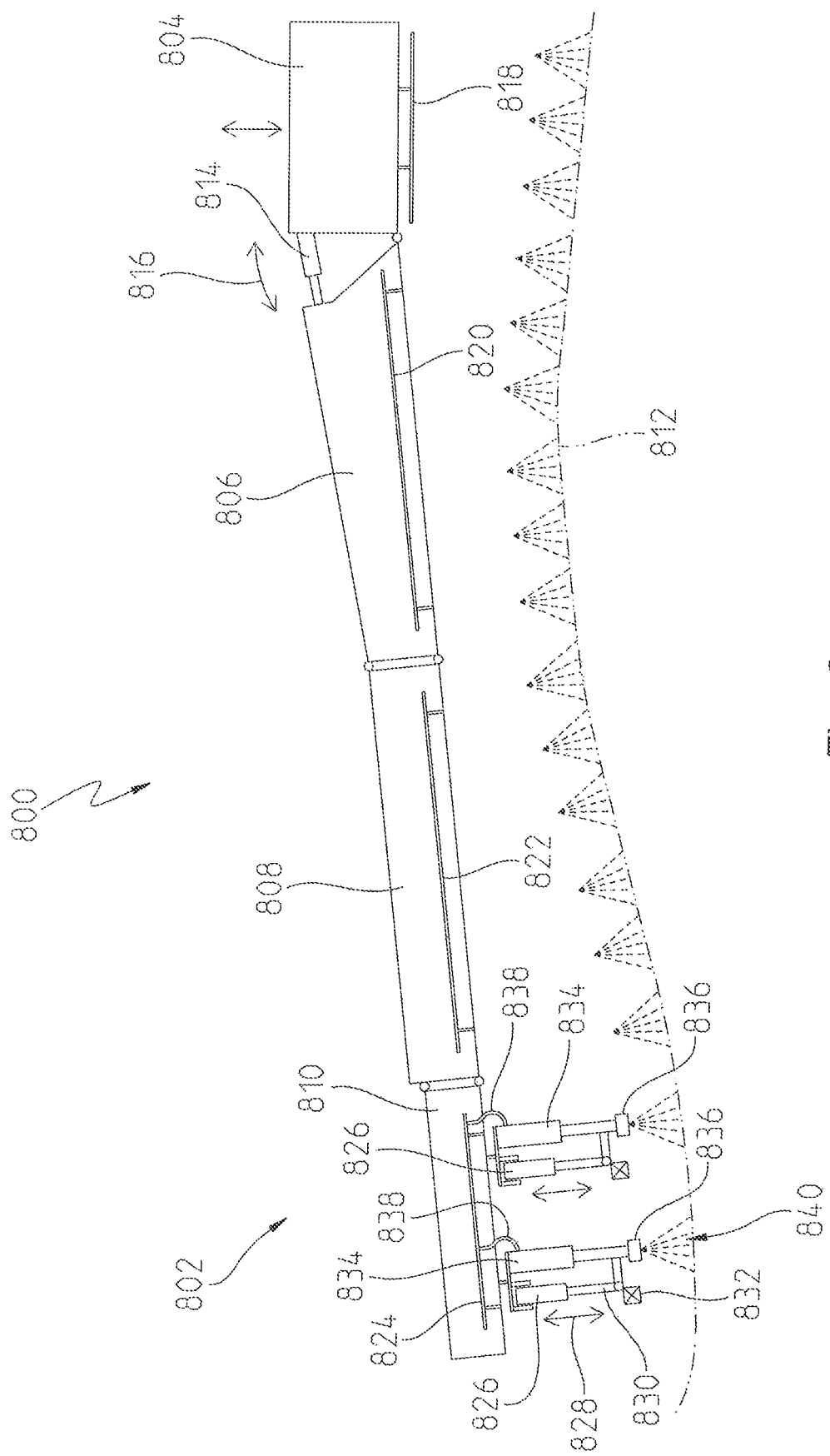
FIG. 8 is a schematic of another embodiment of a sprayer boom frame with a plurality of sections configured for spray section height control.

In FIG. 8, a further embodiment of the present disclosure is illustrated. Here, a spray boom 800 is shown similar to that of FIG. 4. The spray boom 800 may include a boom assembly 802 formed by a first boom frame 806, a second boom frame 808 and a third boom frame 810. The first boom frame 806 may be coupled to a center boom frame 804 similar to that of FIG. 4. The center boom frame 804 may also be coupled to another boom assembly on the side opposite the boom assembly 802. The center boom frame 804 may be raised and lowered via a lift actuator. A tilt cylinder 814 may be provided on each side of the center boom frame 804 for tilting each boom assembly 802 relative thereto about a tilt path 816.

The center boom frame 804 may also include a center frame spray pipe 818 to which a plurality of nozzles (not shown) may be attached for discharging a spray pattern 840 therefrom and onto a ground or crop canopy 812. The spray pipe 818 may be raised and lowered via one or more actuators (not shown) to adjust the spray height of each nozzle mounted to the spray pipe 818 relative to the ground or crop canopy 812.

The first boom frame 806 may include a first spray pipe 820, the second boom frame 808 may include a second spray pipe 822, and the third boom frame 810 may include a third spray pipe 824. It is noteworthy that in this embodiment, each boom frame is shown with a single spray pipe. This is different from FIG. 4 where each boom frame may include two or more spray sections each of which has its own spray pipe. In FIG. 8, however, each boom frame has its own spray pipe and there is only a single spray section associated therewith. Moreover, the spray pipe for each boom frame may be mounted within the boom structure to protect the nozzles.

In an alternative embodiment, each of the first boom frame 806 and second boom frame 808 may include more than a single spray pipe. Each spray pipe may be operably controlled in the same manner as to be described of the embodiment illustrated in FIG. 8.

For simplification of this embodiment, details of the spray section are only shown with respect to the third boom frame 810, but it is to be understood that the same features of the third boom frame are applicable to the first and second boom frames. In FIG. 8, the third boom frame 810 includes a third spray pipe 824. The third spray pipe 824 may be fluidly coupled to a distribution tube and ultimately a tank or reservoir that stores a substance to be sprayed. An actuator 826 may be coupled to the overhead boom frame 810, and the actuator 826 may include a cylinder rod 830 that extends and retracts along a substantially linear direction 828. The end of the cylinder rod 830 may be coupled to a nozzle support structure.

Moreover, a tube assembly is further coupled to the nozzle support structure. The tube assembly may include an outer tube or pipe 834 and an inner tube or pipe 836. The inner tube or pipe 836 is coupled directly to the nozzle support structure and is able to move in a substantially linear direction with respect to the outer tube or pipe 834. A seal material may be disposed between the two tubes to form a tube-in-a-tube arrangement. In this arrangement, the inner tube 836 may be said to be telescopically coupled to the outer tube 834 such that the inner tube 836 is able to extend and retract with respect to the outer tube. Each nozzle or nozzle body may be mounted at the end of the inner tube 836.

As also shown in FIG. 8, a flexible connecting hose 838 may be coupled between the spray pipe 824 and the tube assembly for enabling the spray substance to be fed from the tank or reservoir to a distribution pipe and the spray pipe 824 and then further fed via the flexible connecting hose 838 to the tube assembly and eventually the nozzle. Thus, the nozzles connected to the inner tube 836 may be continuously fed the spray substance via the spray pipe 824, the flexible connecting hose 838, and the tube assembly. Moreover, the actuator 826 is able to extend and retract the inner tube 836 relative to the outer tube 834 to adjust the spray height or distance between each nozzle and the ground or crop canopy 812.

Each nozzle body in FIG. 8 may include its own sensor 832. The sensor may be an ultrasonic sensor or any other type of known sensor. The sensor 832 may be in electrical communication with the controller to communicate actual spray height to the controller. Alternatively, there may be a sensor 832 coupled to every other nozzle body disposed along the spray pipe. The controller may be programmed to calculate or otherwise determine the spray height of each nozzle body that does not include a sensor by comparing the spray heights detected by the sensors immediately adjacent and to each side of the nozzle body.

Each boom frame may include a plurality of actuators and tube assemblies, and there may be any number of nozzles for performing the spraying operation. While only two sets are shown in FIG. 8, it is to be understood that any number of actuators, nozzle bodies, and tube assemblies may be disposed along a single boom frame.

The trip structures of FIGS. 6 and 7 may also be used to protect the nozzle bodies coupled to the inner tubes 836 of FIG. 8. The spray pipe may provide limited flexibility in case there is contact with the ground, crop canopy or another object, but the trip structure may be used to add further protection to the nozzles and nozzle bodies. A spring/damper configuration may be used to bias the nozzles to be aligned properly with the ground or crop canopy 812.

In a further embodiment related to that of FIG. 8, the inner and outer tubes may be replaced by the hose 838 connected directly to the nozzle body such that the single nozzle body is actuated independently of the other nozzle bodies.

Figure 9:
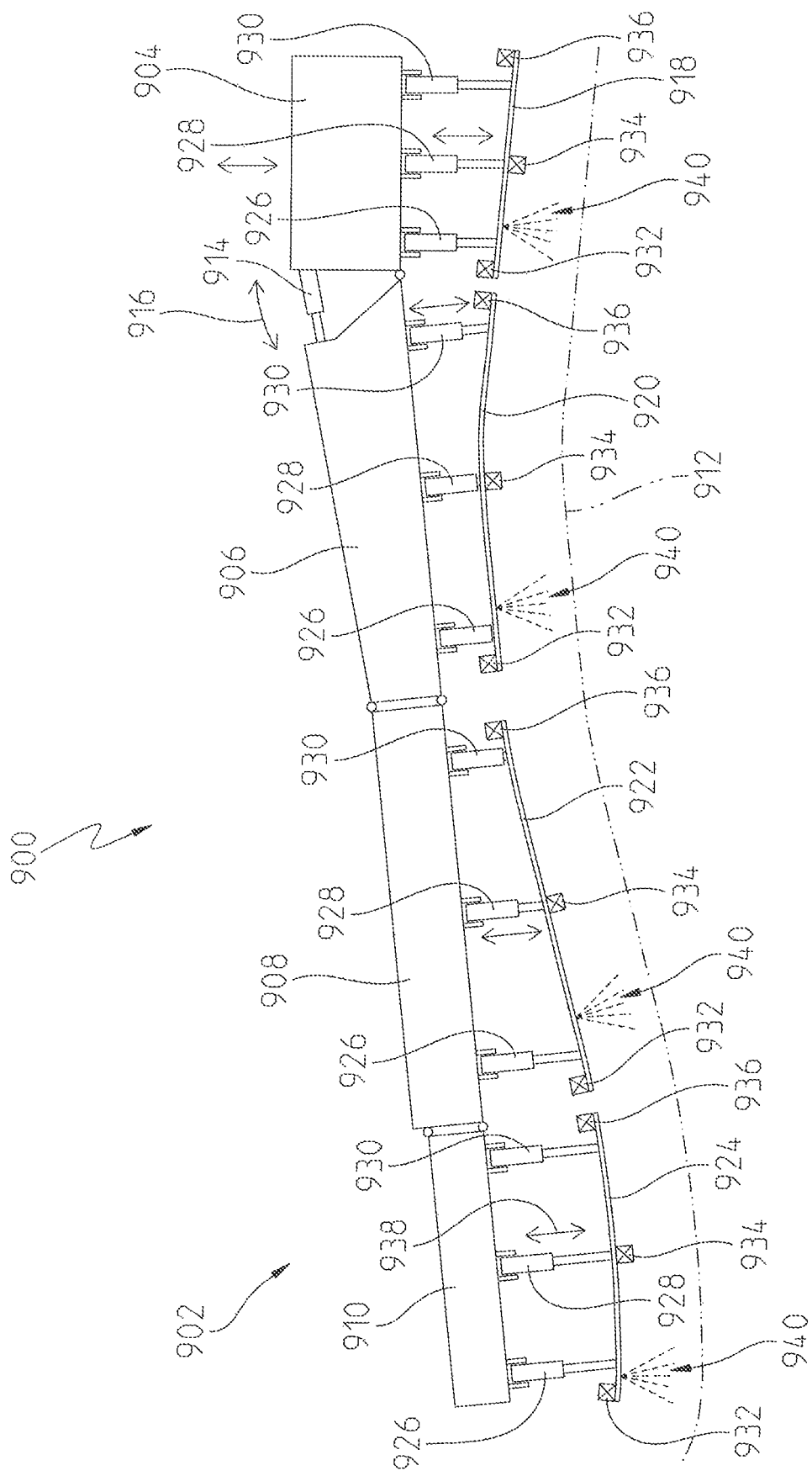
FIG. 9 is a schematic of a further embodiment of a sprayer boom frame with a plurality of sections configured for spray section height control.

In FIG. 9, another embodiment of the present disclosure is provided. In this embodiment, a spray boom 900 is disclosed having a boom assembly 902 with boom frames having flexible spray pipes. In the previous embodiments, each spray pipe was formed of a stainless steel or polymer or other known material that provides limited, if any, flexibility to conform with different terrain. In this embodiment, however, the spray pipes may be formed of a flexible material to better conform with the ground or crop canopy 912.

As shown in FIG. 9, only one side of the spray boom 900 is shown, but it is understood that the spray boom 902 may include a similar boom assembly 902 on the opposite side. Moreover, the spray boom 900 may include a center boom frame 904 that is capable of being raised and lowered by a conventional lift actuator relative to a chassis or frame of a vehicle pulling or pushing the spray boom 900. Moreover, a tilt actuator 914 may be used to pivot the boom assembly 902 about a pivot relative to the center boom frame 904 along an arcuate path 916 as shown in FIG. 9. It should be noted though that while a lift actuator and tilt actuator 914 are described as being included in the illustrated embodiment of FIG. 9, other embodiments with flexible spray pipes may not include a lift and tilt actuators. Thus, for purpose of this disclosure, lift and tilt actuators may be optional and are not required to achieve dynamic spray control height as described herein.

The boom assembly 902 may include one or more boom frames. In FIG. 9, a first boom frame 906 may be pivotably coupled to the center boom frame 904, a second boom frame 908 may be coupled to the first boom frame 906, and a third boom frame 910 may be coupled to the second boom frame 908. The first boom frame 906 may be referred to as the inner wing or boom structure, the second boom frame 908 may be referred to as the outer wing or boom structure, and the third boom frame 910 may be referred to as a breakaway boom structure. While the boom assembly 902 is shown as having three different boom structures, other embodiments may include one or more boom structures.

The center boom frame 904 is shown as including a center spray pipe 918. The center spray pipe 918 may be formed of a flexible material that allows the pipe to bend or flex along its length. A plurality of actuators including a first actuator 926, a second actuator 928, and a third actuator 930 may be coupled between the center boom frame 904 and the spray pipe 918. The first actuator 926 may be coupled at one end of the spray pipe 918, and the third actuator 930 may be coupled at the opposite end thereof. The second actuator 928 may be coupled at a location between the first and third actuators. The spray pipe 918 may include additional actuators coupled thereto. Each actuator may include a cylinder rod coupled to the spray pipe 918 and capable of being extended and retracted in a substantially linear direction 938 within an outer cylinder body of the actuator. Each actuator may be disposed in electrical communication with a controller for controlling the actuation of the cylinder rod.

A plurality of nozzle bodies may be coupled to the spray pipe 918 for discharging a spray pattern 940 therefrom and onto the ground or crop canopy 912. Each nozzle body may include one or more nozzles coupled thereto. Each nozzle may be supplied with a substance for spraying via the spray pipe 918. Moreover, the spray pipe 918 may be in fluid communication with a tank or reservoir which stores the substance. The fluid communication may be via a distribution tube or pipe or any other known means.

The first boom frame 906 is shown as including a first flexible spray pipe 920. The first flexible spray pipe 920 may be in fluid communication with the tank or reservoir for feeding a plurality of nozzles coupled thereto. Each nozzle may receive the substance from the spray pipe 920 and discharge a spray pattern 940 onto the ground or crop canopy 912. Similar to the center spray pipe, the first spray pipe 920 may be an elongated spray pipe which is connected to the first boom frame 906 via a plurality of actuators. In FIG. 9, the plurality of actuators includes a first actuator 926, a second actuator 928 and a third actuator 930. The first actuator 926 may be coupled at one end of the first spray pipe 920 and the third actuator 930 may be coupled at an opposite end thereof. The second actuator 928 may be coupled to the spray pipe 920 at a location between the first and third actuators. Each actuator may be operably controlled by the controller to extend and retract a cylinder rod within an outer cylinder body. As the cylinder rod extends and retracts, it flexes or bends the spray pipe 920. This is shown in FIG. 9 where the first spray pipe 920 has a flexibility to bend due to the extension or retraction of each actuator. As it does so, the nozzle bodies along the spray pipe 920 may be maintained at a desired spray height from the ground or crop canopy 912.

The first spray pipe 920 may also include a plurality of sensors coupled thereto. As shown, a first sensor 932 may be coupled at a location at or near the first actuator 926. A second sensor 934 may be coupled at a location at or near the second actuator 928. Similarly, a third sensor 936 may be coupled at a location at or near the third actuator 930. Each sensor may be an ultrasonic sensor or any other known type of sensor. The sensors may be in electrical communication with the controller to communicate a detected spray height distance along the length of the spray pipe 920. As such, the controller is configured to receive each spray height measurement from the plurality of sensors and actuate the different plurality of actuators to maintain the spray height of each nozzle along the spray pipe 920 at or near a targeted or desired spray height. The targeted or desired spray height may include a target spray height and a tolerance range (e.g., 20 inches+/−3 inches).

The second boom frame 908 may include a second flexible spray pipe 922 and the third boom frame 910 may include a third flexible spray pipe 924. Each flexible spray pipe may be similar to the first spray pipe 920 as described above. In other words, each spray pipe may include a plurality of nozzle bodies and nozzles coupled thereto. A plurality of actuators may flex the spray pipe relative to the overhead boom structure to conform the spray pipe to the ground or crop canopy 912. Sensors may detect the spray height at different locations along the spray pipe length and communicate these heights to the controller. In turn, the controller is able to compare the actual spray heights to the targeted or desired spray height, and operably control the plurality of actuators to flex or bend the spray pipe to conform with the ground or crop canopy 912 as needed.

As described above, the lift and tilt actuators are optional features in this embodiment. If present, the lift and tilt actuators may be operably controlled by the controller to make coarse adjustments to the boom assembly. On the other hand, the plurality of actuators disposed along the lengths of the different spray pipes may be used to make more precise adjustments to the spray heights. Thus, in this embodiment, the control system may include a control algorithm capable of making coarse adjustments to spray height via the lift and tilt actuators and precise adjustments at different locations along the boom assembly 902 via the aforementioned actuators.

The trip structures of FIGS. 6 and 7 may also be used to protect the nozzle bodies coupled to the spray pipes of FIG. 9. A spring/damper configuration may be used to bias the nozzles to be aligned properly with the ground or crop canopy 912.

Figure 10:
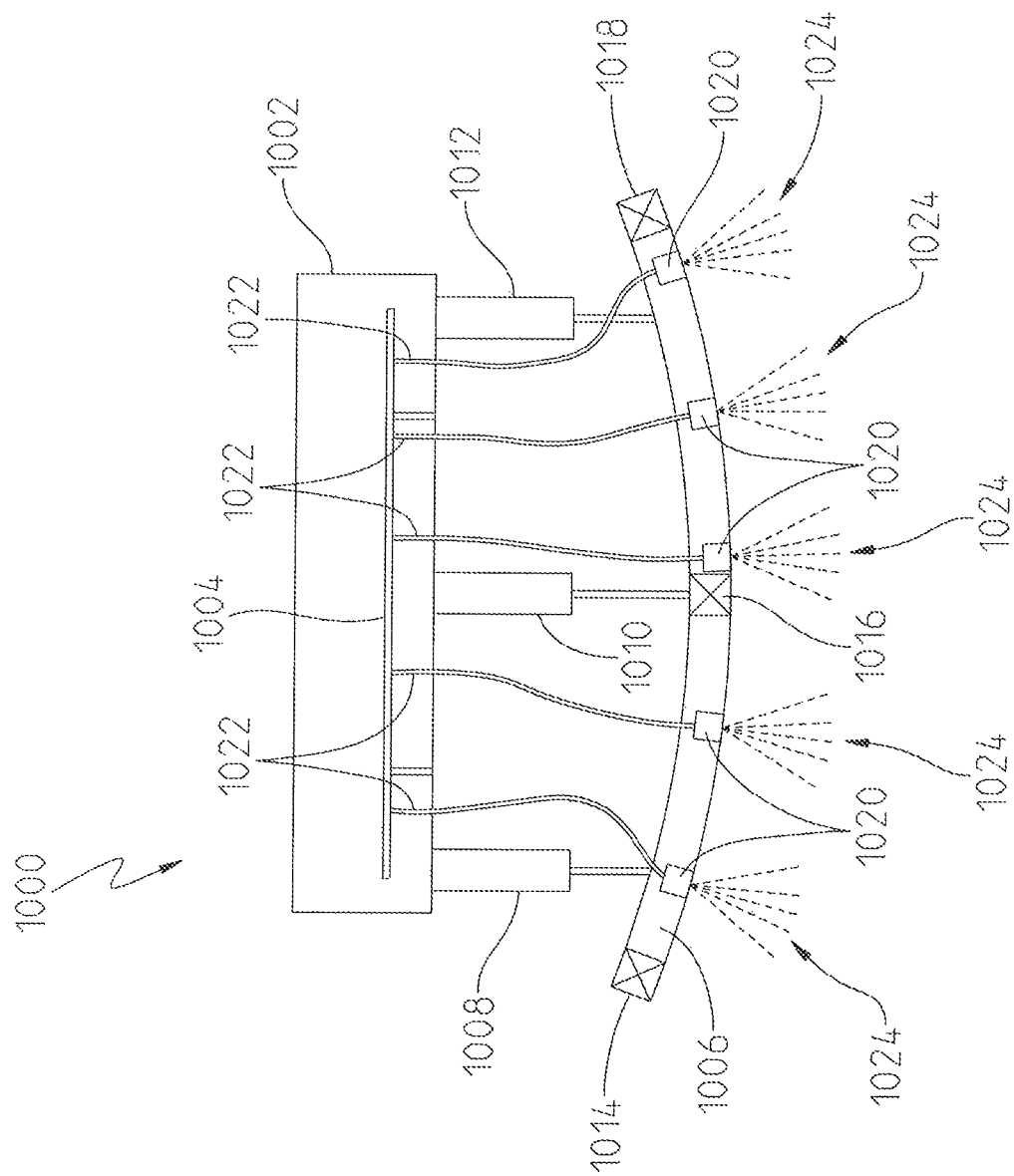
FIG. 10 is a portion of the spray section of the spray boom frame of FIG. 9 with a flexible support member.

In an alternative embodiment to that depicted in FIG. 9, a spray boom 1000 is shown in FIG. 10. Here, only a portion of the spray boom 1000 is shown, but it may include an overhead boom structure such as a boom frame 1002. Unlike FIG. 9, where the boom frame included a spray pipe disposed below the frame, the boom frame 1002 of FIG. 10 may include a spray pipe 1004 mounted directly thereto. The spray pipe 1004 may be fluidly coupled to a tank or reservoir (not shown) via a distribution tube or pipe or other known piping structure.

As shown in this embodiment, however, a flexible support member 1006 is provided to which a plurality of nozzle assemblies 1020 are coupled. Each nozzle assembly 1020 may include a nozzle body and one or more nozzles with spray tips for discharging a spray pattern 1024. Moreover, each nozzle assembly 1020 may be supplied with the substance to spray via flexible hoses 1022. The flexible hoses 1022 may be coupled at one end to the spray pipe 1004 and at an opposite end to the nozzle assembly 1020. In the embodiment of FIG. 10, each nozzle assembly 1020 may have its own flexible hose 1022. In another embodiment, however, there may be one flexible hose 1022 capable of supplying to two or more nozzle assemblies 1020.

The flexible support member 1006 may be coupled to a plurality of actuators. As shown, the plurality of actuators may include a first actuator 1008, a second actuator 1010, and a third actuator 1012. The first actuator 1008 may be coupled at or near one end of the flexible support member 1006 and the third actuator 1012 may be coupled at or near an opposite end thereof. The second actuator 1010 may be coupled at a location along the flexible support member 1006 between the first and second actuators. Each actuator may include a rod that extends and retracts within an outer housing. The rod may be connected to the flexible support member, and as the rod extends and retracts, the flexible support member may flex or bend. As such, the flexible support member 1006 may flex to conform with the underlying terrain to maintain or adjust the spray height of each nozzle assembly 1020.

As also shown in FIG. 10, a plurality of sensors may be disposed along the length of the flexible support member 1006. The plurality of sensors may include a first sensor 1014, a second sensor 1016 and a third sensor 1018. Each sensor may be spaced along the length of the flexible support member 1006 and disposed in electrical communication with a controller. Likewise, the controller may be in electrical communication with the plurality of actuators for controlling actuation. In the embodiment of FIG. 10, the first sensor 1014 may be disposed near the first actuator 1008, the second sensor 1016 disposed near the second actuator 1010, and the third sensor 1018 disposed near the third actuator 1012. As such, each sensor may be able to detect an actual spray height of the nozzles at the location of each actuator, and the controller can thereby receive the actual spray heights and actuate one or more of the plurality of actuators to adjust or flex the support member 1006 to conform it to the underlying ground or crop canopy.

The trip structures of FIGS. 6 and 7 may also be used to protect the nozzle bodies coupled to the spray pipe 1004 or flexible support member 1006 of FIG. 10. A spring/damper configuration may be used to bias the nozzles to be aligned properly with the ground or crop canopy.

Figure 11:
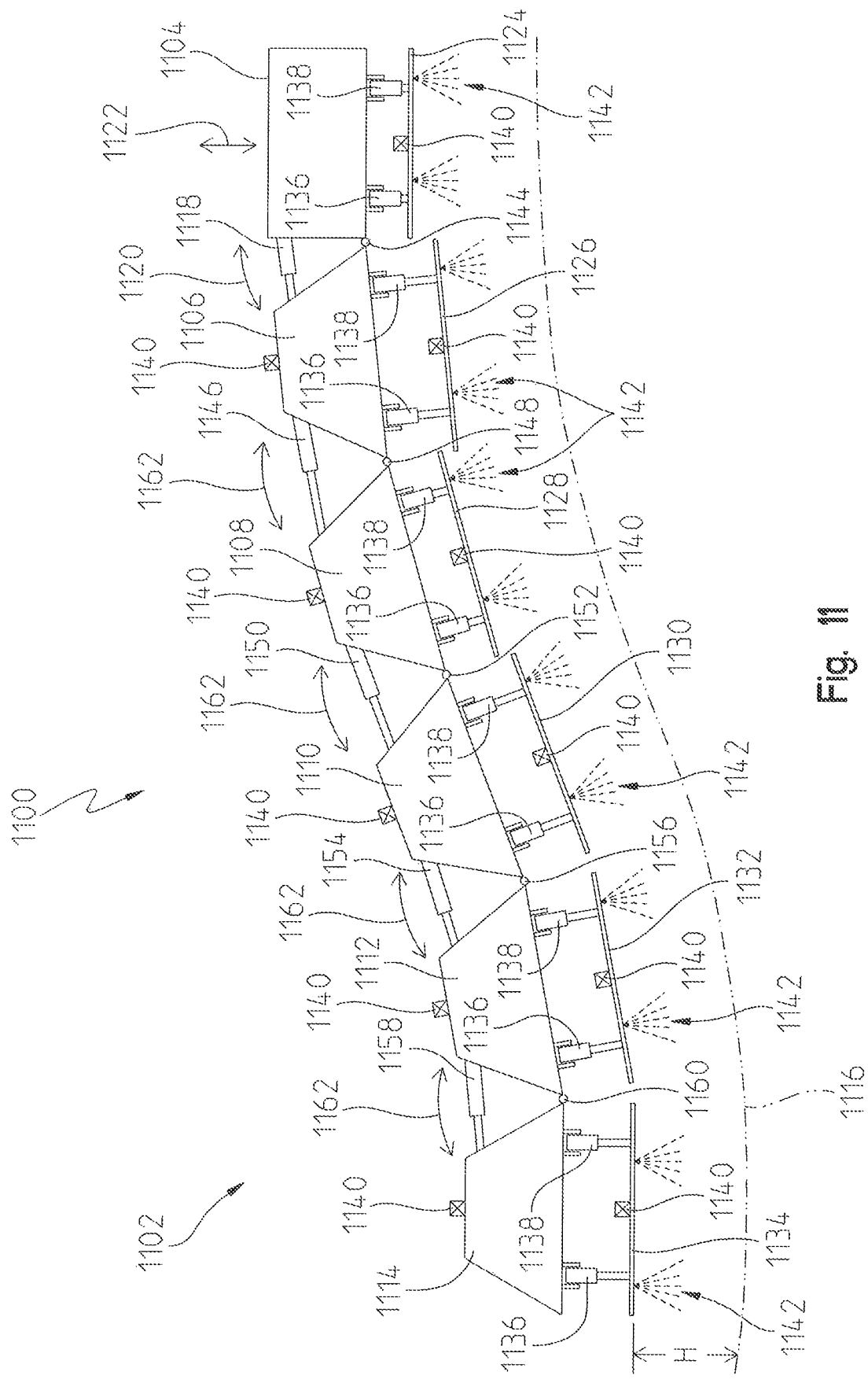
FIG. 11 is a schematic of yet another embodiment of a sprayer boom frame with a plurality of sections configured for spray section height control.

A further embodiment of present disclosure is illustrated in FIG. 11. In this embodiment, a multi jointed spray boom 1100 is shown having a boom assembly 1102 pivotably coupled to a center boom frame 1104. Although only one side of the spray boom 1100 is shown in FIG. 11, it is to be understand that a similar boom assembly 1102 may be provided on the opposite side of the center boom frame 1104.

The boom assembly 1102 may include a plurality of boom frames or boom structures. For instance, the boom assembly 1102 may include a first boom frame 1106, a second boom frame 1108, a third boom frame 1110, a fourth boom frame 1112, and a fifth boom frame 1114. The first boom frame 1106 may be referred to as a first inner wing structure and the second boom frame 1108 may be referred to as a second inner wing structure. The third boom frame 1110 may be referred to as a first outer wing structure and the fourth boom frame 1112 may be referred to as a second outer wing structure. The fifth boom frame 1114 may be referred to as a breakaway structure.

Each of the boom frames may be pivotably coupled with respect to one another. For example, the first boom frame 1106 may be pivotably coupled to the center boom frame 1104 via a first pivot 1144. A center boom frame 1104 may be actuated in a raised or lowered direction 1122 via a lift actuator (not shown), and the boom assembly 1102 may be pivoted with respect to the center boom frame 1104 via a tilt actuator 1118 in a pivot direction 1120. The tilt actuator, like all of the actuators in this disclosure, may be operably controlled by a controller. The actuator may be a mechanical actuator, an electrical actuator, a hydraulic actuator, a pneumatic actuator, or a combination thereof. The tilt actuator may extend and retract a rod coupled to the first boom frame 1106 in order to pivot the boom assembly 1102 about the first pivot 1144.

The second boom frame 1108 may be pivotably coupled to the first boom frame 1106 via a second pivot 1148. To control pivotal movement between the boom frames, an actuator 1146 may be coupled therebetween. The actuator 1146 may include a rod coupled to the second boom frame 1108, and the actuator 1146 may be operably controlled by the controller to extend and retract the rod to cause the second boom frame 1108 to pivot in an arcuate direction 1162 relative to the first boom frame 1106. As the second boom frame 1108 pivots about the second pivot 1148, it is understood that the third, fourth and fifth boom frames may also pivot with the second boom frame 1108. Thus, control of the actuator 1146 induces movement of the boom frames outward of the first boom frame 1106.

The third boom frame 1110 may be pivotably coupled to the second boom frame 1108 via a third pivot 1152. To control pivotal movement between the boom frames, an actuator 1150 may be coupled therebetween. The actuator 1150 may include a rod coupled to the third boom frame 1110, and the actuator 1150 may be operably controlled by the controller to extend and retract the rod to cause the third boom frame 1110 to pivot in an arcuate direction 1162 relative to the second boom frame 1108. As the third boom frame 1110 pivots about the third pivot 1152, it is understood that the fourth and fifth boom frames may also pivot with the third boom frame 1110. Thus, control of the actuator 1150 induces movement of the boom frames outward of the second boom frame 1108.

The fourth boom frame 1112 may be pivotably coupled to the third boom frame 1110 via a fourth pivot 1156. To control pivotal movement between the boom frames, an actuator 1154 may be coupled therebetween. The actuator 1154 may include a rod coupled to the fourth boom frame 1112, and the actuator 1154 may be operably controlled by the controller to extend and retract the rod to cause the fourth boom frame 1112 to pivot in an arcuate direction 1162 relative to the third boom frame 1110. As the fourth boom frame 1112 pivots about the fourth pivot 1156, it is understood that the fifth boom frame may also pivot with the fourth boom frame 1112. Thus, control of the actuator 1154 induces movement of the boom frames outward of the third boom frame 1110.

Lastly, the fifth boom frame 1114 may be pivotably coupled to the fourth boom frame 1112 via a fifth pivot 1160. To control pivotal movement between the boom frames, an actuator 1158 may be coupled therebetween. The actuator 1158 may include a rod coupled to the fifth boom frame 1114, and the actuator 1158 may be operably controlled by the controller to extend and retract the rod to cause the fifth boom frame 1114 to pivot in an arcuate direction 1162 relative to the fourth boom frame 1112.

Thus, as described above, each boom frame in this embodiment is capable of pivoting relative to one another. In one non-limiting example, the boom frames may pivot less than 20° about the respective pivot. In another example, the boom frames may pivot 15° or less about the respective pivot. In any event, the amount each boom frame is able to pivot allows the boom assembly 1102 to form an arcuate boom structure from the center boom frame 1104. As a result, the boom assembly 1102 is better able to conform to an underlying ground or crop canopy 1116.

To control the pivotal movement of each boom frame, one or more sensors 1140 may be coupled to each boom frame. Each sensor 1140 may be disposed in electrical communication with the controller. Thus, the controller may be programmed with a control algorithm to operably control the pivotal relationship between boom frames to better conform the boom assembly 1102 to the underlying terrain.

The multi jointed boom assembly 1102 of this embodiment may also include adjustable spray pipes and such for accommodating objects and other changes in the underlying ground or crop canopy 1116. For example, as shown in FIG. 11, each boom frame may include its own spray pipe. The center boom frame 1104 may include a center spray pipe 1124, the first boom frame 1106 may include a first spray pipe 1126, the second boom frame 1108 may include a second spray pipe 1128, the third boom frame 1110 may include a third spray pipe 1130, the fourth boom frame 1112 may include a fourth spray pipe 1132, and the fifth boom frame 1114 may include a fifth spray pipe 1134. A plurality of nozzle bodies and nozzles may be coupled to each spray pipe, and each of the nozzles may receive a substance from the spray pipe to discharge a spray pattern 1142 onto the ground or crop canopy 1116. The substance may be stored in a tank or reservoir (not shown). During a spraying operation, the substance may be supplied from the tank or reservoir through a distribution pipe or other conventional piping means to each spray pipe. Although not shown, flexible pipes or other such means may be used to further feed the substance to the spray pipes.

Each of the aforementioned spray pipes may also be controlled by a plurality of actuators. For example, the plurality of actuators may include a first actuator 1136 and a second actuator 1138. With respect to the first boom frame 1106, the first actuator 1136 may be coupled to one end of the first spray pipe 1126 and the second actuator 1138 may be coupled to an opposite end thereof. Other actuators may be coupled therebetween to the first spray pipe 1126. Each actuator may extend and retract a rod which is coupled to the first spray pipe 1126 to raise or lower the spray pipe so the spray pipe is parallel to the crop canopy or the ground surface below. In some instances, the actuators may extend and retract along a liner direction 1122. One or more sensors 1140 may be coupled to the spray pipe 1126 and communicate a spray height, H, between the spray pipe 1126 and the ground or crop canopy 1116 to the controller. In turn, the controller may be able to compare the detected spray height and compare it to a targeted or desired spray height. If the actual or detected spray height satisfied the targeted spray height, the controller may take no further action. However, if the result of comparing the two to one another did not satisfy the targeted spray height, the controller may execute a control algorithm to either operably control one of the first or second actuators 1136, 1138, or operably control one of the boom articulation actuators 1146, 1150, 1154, 1158 until the actual spray height, H, satisfied the targeted spray height. This same procedure may be applied to each of the spray heights along the center boom frame 1104, first boom frame 1106, second boom frame 1108, third boom frame 1110, fourth boom frame 1112, and fifth boom frame 1114.

The boom articulation actuators 1146, 1150, 1154, 1158 described herein may be referred to as tilt actuators similar to the tilt actuator 1118 described above. In effect, each actuator may operate in a similar manner by articulating or tilting the boom assembly 1102 with respect to a certain pivot location. The location of the pivot locations or tilt joints may vary, and the illustrated embodiment of FIG. 11 is only intended to be one such example. In some cases, there may be multiple tilt joints between adjacent boom frames. Moreover, while only one tilt actuator is shown between adjacent boom frames, in other embodiments there may be two or more tilt actuators.

The trip structures of FIGS. 6 and 7 may also be used to protect the nozzle bodies coupled to the spray pipes of FIG. 11. A spring/damper configuration may be used to bias the nozzles to be aligned properly with the ground or crop canopy 1116.

Figure 12:
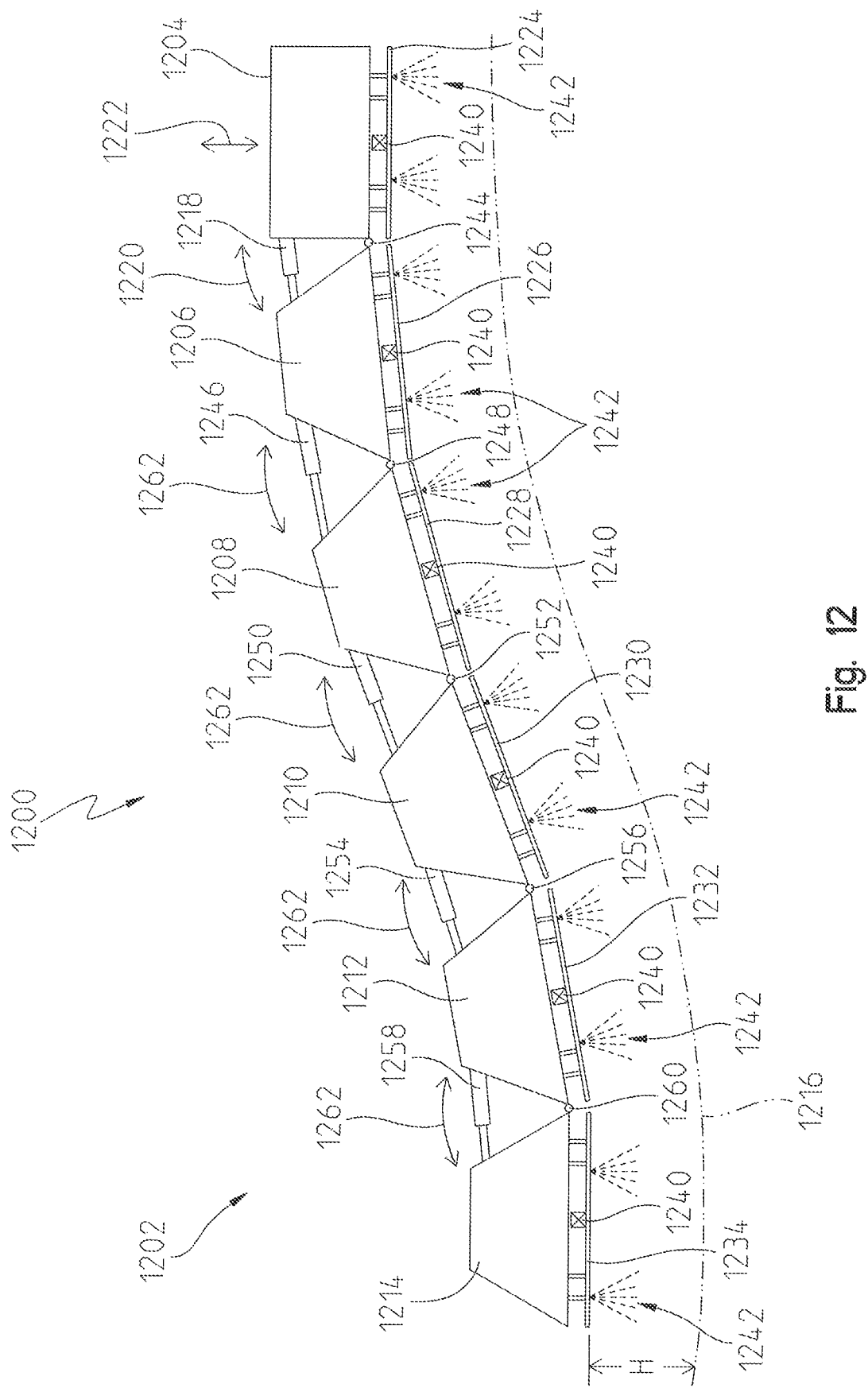
FIG. 12 is a schematic of a further embodiment of a sprayer boom frame with a plurality of sections configured for spray section height control.

Another embodiment of present disclosure is illustrated in FIG. 12. In this embodiment, a multi jointed spray boom 1200 is shown having a boom assembly 1202 pivotably coupled to a center boom frame 1204. Although only one side of the spray boom 1200 is shown in FIG. 12, it is to be understand that a similar boom assembly 1202 may be provided on the opposite side of the center boom frame 1204.

The boom assembly 1202 may include a plurality of boom frames or boom structures. For instance, the boom assembly 1202 may include a first boom frame 1206, a second boom frame 1208, a third boom frame 1210, a fourth boom frame 1212, and a fifth boom frame 1214. The first boom frame 1206 may be referred to as a first inner wing structure and the second boom frame 1208 may be referred to as a second inner wing structure. The third boom frame 1210 may be referred to as a first outer wing structure and the fourth boom frame 1212 may be referred to as a second outer wing structure. The fifth boom frame 1214 may be referred to as a breakaway structure.

Each of the boom frames may be pivotally coupled with respect to one another. For example, the first boom frame 1206 may be pivotably coupled to the center boom frame 1204 via a first pivot 1244. A center boom frame 1204 may be actuated in a raised or lowered direction 1222 via a lift actuator (not shown), and the boom assembly 1202 may be pivoted with respect to the center boom frame 1204 via a tilt actuator 1218 in a pivot direction 1220. The tilt actuator, like all of the actuators in this disclosure, may be operably controlled by a controller. The actuator may be a mechanical actuator, an electrical actuator, a hydraulic actuator, a pneumatic actuator, or a combination thereof. The tilt actuator may extend and retract a rod coupled to the first boom frame 1206 in order to pivot the boom assembly 1202 about the first pivot 1244.

The second boom frame 1208 may be pivotably coupled to the first boom frame 1206 via a second pivot 1248. To control pivotal movement between the boom frames, an actuator 1246 (i.e., a tilt actuator) may be coupled therebetween. The actuator 1246 may include a rod coupled to the second boom frame 1208, and the actuator 1246 may be operably controlled by the controller to extend and retract the rod to cause the second boom frame 1208 to pivot in an arcuate direction 1262 relative to the first boom frame 1206. As the second boom frame 1208 pivots about the second pivot 1248, it is understood that the third, fourth and fifth boom frames may also pivot with the second boom frame 1208. Thus, control of the actuator 1246 induces movement of the boom frames outward of the first boom frame 1206.

The third boom frame 1210 may be pivotably coupled to the second boom frame 1208 via a third pivot 1252. To control pivotal movement between the boom frames, an actuator 1250 may be coupled therebetween. The actuator 1250 may include a rod coupled to the third boom frame 1210, and the actuator 1250 may be operably controlled by the controller to extend and retract the rod to cause the third boom frame 1210 to pivot in an arcuate direction 1262 relative to the second boom frame 1208. As the third boom frame 1210 pivots about the third pivot 1252, it is understood that the fourth and fifth boom frames may also pivot with the third boom frame 1210. Thus, control of the actuator 1250 induces movement of the boom frames outward of the second boom frame 1208.

The fourth boom frame 1212 may be pivotably coupled to the third boom frame 1210 via a fourth pivot 1256. To control pivotal movement between the boom frames, an actuator 1254 may be coupled therebetween. The actuator 1254 may include a rod coupled to the fourth boom frame 1212, and the actuator 1254 may be operably controlled by the controller to extend and retract the rod to cause the fourth boom frame 1212 to pivot in an arcuate direction 1262 relative to the third boom frame 1210. As the fourth boom frame 1212 pivots about the fourth pivot 1256, it is understood that the fifth boom frame may also pivot with the fourth boom frame 1212. Thus, control of the actuator 1254 induces movement of the boom frames outward of the third boom frame 1210.

Lastly, the fifth boom frame 1214 may be pivotably coupled to the fourth boom frame 1212 via a fifth pivot 1260. To control pivotal movement between the boom frames, an actuator 1258 may be coupled therebetween. The actuator 1258 may include a rod coupled to the fifth boom frame 1214, and the actuator 1258 may be operably controlled by the controller to extend and retract the rod to cause the fifth boom frame 1214 to pivot in an arcuate direction 1262 relative to the fourth boom frame 1212.

Thus, as described above, each boom frame in this embodiment is capable of pivoting relative to one another. In one non-limiting example, the boom frames may pivot less than 20° about the respective pivot. In another example, the boom frames may pivot 15° or less about the respective pivot. In any event, the amount each boom frame is able to pivot allows the boom assembly 1202 to form an arcuate boom structure from the center boom frame 1204. As a result, the boom assembly 1202 is better able to conform to an underlying ground or crop canopy 1216.

To control the pivotal movement of each boom frame, one or more sensors (not shown) may be coupled to each boom frame. Each sensor may be disposed in electrical communication with the controller. Thus, the controller may be programmed with a control algorithm to operably control the pivotal relationship between boom frames to better conform the boom assembly 1202 to the underlying terrain.

The multi jointed boom assembly 1202 of this embodiment may also include adjustable spray pipes and such for accommodating objects and other changes in the underlying ground or crop canopy 1216. For example, as shown in FIG. 12, each boom frame may include its own spray pipe. The center boom frame 1204 may include a center spray pipe 1224, the first boom frame 1206 may include a first spray pipe 1226, the second boom frame 1208 may include a second spray pipe 1228, the third boom frame 1210 may include a third spray pipe 1230, the fourth boom frame 1212 may include a fourth spray pipe 1232, and the fifth boom frame 1214 may include a fifth spray pipe 1234. A plurality of nozzle bodies and nozzles may be coupled to each spray pipe, and each of the nozzles may receive a substance from the spray pipe to discharge a spray pattern 1242 onto the ground or crop canopy 1216. The substance may be stored in a tank or reservoir (not shown). During a spraying operation, the substance may be supplied from the tank or reservoir through a distribution pipe or other conventional piping means to each spray pipe. Although not shown, flexible pipes or other such means may be used to further feed the substance to the spray pipes.

Each of the aforementioned spray pipes may be coupled directly to the respective boom frame. As such, and unlike the embodiment of FIG. 11, the spray pipes are not moved via one or more actuators relative to the boom frame. Moreover, one or more sensors 1240 may be coupled to each spray pipe and communicate a spray height, H, between the respective spray pipe and the ground or crop canopy 1216 to the controller. In turn, the controller may be able to compare the detected spray height and compare it to a targeted or desired spray height. If the actual or detected spray height satisfied the targeted spray height, the controller may take no further action. However, if the result of comparing the two to one another did not satisfy the targeted spray height, the controller may execute a control algorithm to operably control one of the boom articulation actuators 1246, 1250, 1254, 1258 until the actual spray height, H, satisfied the targeted spray height. This procedure may be applied to each of the spray heights along the center boom frame 1204, first boom frame 1206, second boom frame 1208, third boom frame 1210, fourth boom frame 1212, and fifth boom frame 1214.

The boom articulation actuators 1246, 1250, 1254, 1258 described herein may be referred to as tilt actuators similar to the tilt actuator 1218 described above. In effect, each actuator may operate in a similar manner by articulating or tilting the boom assembly 1202 with respect to a certain pivot location. The location of the pivot locations or tilt joints may vary, and the illustrated embodiment of FIG. 12 is only intended to be one such example. In some cases, there may be multiple tilt joints between adjacent boom frames. Moreover, while only one tilt actuator is shown between adjacent boom frames, in other embodiments there may be two or more tilt actuators.

The trip structures of FIGS. 6 and 7 may also be used to protect the nozzle bodies coupled to the spray pipes of FIG. 12. A spring/damper configuration or hydraulic actuator/accumulator configuration, or other known assembly, may be used to bias the nozzles to be aligned properly with the ground or crop canopy 1216.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A spray boom comprising:
a plurality of boom frames comprising at least a first boom frame and a second boom frame, where the first boom frame is coupled to the second boom frame;
a first spray section coupled to the first boom frame, the first spray section including an elongated first spray pipe configured to be fluidly coupled to a fluid source;
a first elongated support member coupled to the first spray pipe, the first support member being located below the first spray pipe;
a plurality of nozzles coupled directly to the first spray pipe and configured to be fluidly coupled to the fluid source via the first spray pipe;
a first actuator coupled at one end to the first boom frame and at an opposite end to a first portion of the first support member, the first actuator controllably extending and retracting to move the first portion of the first support member between a raised position and a lowered position relative to an underlying surface;
a second actuator coupled at one end to the first boom frame and at an opposite end to a second portion of the first support member, the second actuator controllably extending and retracting to move the second portion of the first support member between a raised position and a lowered position relative to the underlying surface; and
a controller coupled to each one of the first and second actuators, wherein the controller operably controls movement of the first actuator and the second actuator independently of one another, wherein the control performed by the controller enables the first spray pipe and first support member to be disposed at different angles relative to the first boom frame;
wherein the first spray pipe has a first length and the first support member has a second length, the second length being greater than the first length.

2. The spray boom of claim 1, wherein the first spray pipe and first support member are positioned generally parallel with one another.

3. The spray boom of claim 1, wherein the plurality of nozzles is coupled below the first spray pipe.

4. The spray boom of claim 1, wherein at least one of the plurality of nozzles is located below the first boom frame when either the first actuator or the second actuator is in a fully extended position.

5. The spray boom of claim 1, wherein all of the plurality of nozzles are located below the first boom frame when the first and second actuators are fully extended.

6. The spray boom of claim 1, wherein the first spray pipe and first support member are located below the first boom frame in the lowered position.

7. The spray boom of claim 1, wherein the first boom frame is pivotally coupled to the second boom frame.

8. The spray boom of claim 7, further comprising a third actuator coupled between the first boom frame and the second boom frame, the third actuator operably controlled by the controller to pivot the first boom frame relative to the second boom frame.

9. The spray boom of claim 1, wherein the first boom frame comprises a breakaway frame.

10. A spray boom comprising:
a plurality of boom frames comprising at least a first boom frame and a second boom frame, where the first boom frame is coupled to the second boom frame;
a first spray section coupled to the first boom frame, the first spray section including an elongated first spray pipe configured to be fluidly coupled to a fluid source;
a first elongated support member coupled to the first spray pipe;
a plurality of nozzles coupled directly to the first spray pipe and configured to be fluidly coupled to the fluid source via the first spray pipe, each of the plurality of nozzles including an outlet for discharging a spray, the outlet of each of the plurality of nozzles being positioned in a gap formed between the first spray pipe and the first support member;
a first actuator coupled at one end to the first boom frame and at an opposite end to a first portion of the first support member, the first actuator controllably extending and retracting to move the first portion of the first support member between a raised position and a lowered position relative to an underlying surface;
a second actuator coupled at one end to the first boom frame and at an opposite end to a second portion of the first support member, the second actuator controllably extending and retracting to move the second portion of the first support member between a raised position and a lowered position relative to the underlying surface; and
a controller coupled to each one of the first and second actuators, wherein the controller operably controls movement of the first actuator and the second actuator independently of one another, wherein the control performed by the controller enables the first spray pipe and first support member to be disposed at different angles relative to the first boom frame;
wherein, the first boom frame, the first spray pipe, the first support member and the plurality of nozzles are located in the same plane.

11. The spray boom of claim 10, wherein the first support member is located below the first spray pipe.

12. The spray boom of claim 11, wherein the first spray pipe is located between the first and second actuators.

13. The spray boom of claim 10, wherein the first spray pipe is coupled to the first support member in at least a first location and a second location.

14. The spray boom of claim 10, wherein the first and second actuators are coupled in a pivotal, non-translational manner to the first support member.

15. The spray boom of claim 10, wherein at least one of the plurality of nozzles is located below the first boom frame when either the first actuator or the second actuator is in a fully extended position.

16. A spray boom comprising:
a plurality of boom frames comprising at least a first boom frame and a second boom frame, where the first boom frame is coupled to the second boom frame;
a first spray section coupled to the first boom frame, the first spray section including an elongated first spray pipe configured to be fluidly coupled to a fluid source;
a first elongated support member coupled to the first spray pipe;
a plurality of nozzles coupled directly to the first spray pipe and configured to be fluidly coupled to the fluid source via the first spray pipe, each of the plurality of nozzles comprising a nozzle body and tip, wherein each nozzle body and tip are located above the first support member;
a first actuator coupled at one end to the first boom frame and at an opposite end to a first portion of the first support member, the first actuator controllably extending and retracting to move the first portion of the first support member between a raised position and a lowered position relative to an underlying surface;
a second actuator coupled at one end to the first boom frame and at an opposite end to a second portion of the first support member, the second actuator controllably extending and retracting to move the second portion of the first support member between a raised position and a lowered position relative to the underlying surface; and
a controller coupled to each one of the first and second actuators, wherein the controller operably controls movement of the first actuator and the second actuator independently of one another, wherein the control performed by the controller enables the first spray pipe and first support member to be disposed at different angles relative to the first boom frame;
wherein, at least one of the plurality of nozzles is located below the first boom frame when either the first actuator or the second actuator is in a fully extended position.

17. The spray boom of claim 16, wherein all of the plurality of nozzles are located below the first boom frame when the first and second actuators are fully extended.

18. The spray boom of claim 16, wherein the first spray pipe and first support member are located below the first boom frame in the lowered position.

19. The spray boom of claim 16, further comprising:
a second spray section coupled to the second boom frame, the second spray section including an elongated second spray pipe configured to be fluidly coupled to a fluid source;
a second elongated support member coupled to the second spray pipe;
a second plurality of nozzles coupled directly to the second spray pipe and configured to be fluidly coupled to the fluid source via the second spray pipe;
a third actuator coupled at one end to the second boom frame and at an opposite end to a first portion of the second support member, the third actuator controllably extending and retracting to move the first portion of the second support member between a raised position and a lowered position relative to an underlying surface;
a fourth actuator coupled at one end to the second boom frame and at an opposite end to a second portion of the second support member, the fourth actuator controllably extending and retracting to move the second portion of the second support member between a raised position and a lowered position relative to the underlying surface; and
wherein, the controller is coupled to each one of the third and fourth actuators, wherein the controller operably controls movement of the third actuator and the fourth actuator independently of one another, wherein the control performed by the controller enables the second spray pipe and second support member to be disposed at different angles relative to the second boom frame;

wherein, at least one of the second plurality of nozzles is located below the second boom frame when either the third actuator or the fourth actuator is in a fully extended position.

20. The spray boom of claim 16, wherein the first spray pipe and the first support member are aligned with one another in a plane that is perpendicular to a forward travel direction of the spray boom.

* * * * *